(12) United States Patent
Smith et al.

(10) Patent No.: US 7,656,931 B2
(45) Date of Patent: Feb. 2, 2010

(54) HYBRID SPREAD SPECTRUM RADIO SYSTEM

(75) Inventors: Stephen F. Smith, London, TN (US); William B. Dress, Camas, WA (US)

(73) Assignee: UT-Battelle, LLC, Oak Ridge, TN (US)

( * ) Notice: Subject to any disclaimer, the term of this patent is extended or adjusted under 35 U.S.C. 154(b) by 71 days.

(21) Appl. No.: 10/750,432

(22) Filed: Dec. 31, 2003

(65) Prior Publication Data

US 2005/0141594 A1 Jun. 30, 2005

(51) Int. Cl.
*H04B 1/707* (2006.01)
*H04B 1/713* (2006.01)

(52) U.S. Cl. .................. 375/131; 375/135; 375/146

(58) Field of Classification Search ......... 375/130–132, 375/135, 140, 143, 146, 295, 316
See application file for complete search history.

(56) References Cited

U.S. PATENT DOCUMENTS

| | | | |
|---|---|---|---|
| 3,475,558 A | 10/1969 | Cahn | |
| 4,084,137 A | 4/1978 | Welti | |
| 4,435,821 A | 3/1984 | Ito et al. | |
| 4,521,878 A | 6/1985 | Toyonaga | |
| 4,550,292 A | 10/1985 | Smith | |
| 4,888,787 A * | 12/1989 | Kisak | 375/136 |
| 5,274,665 A | 12/1993 | Schilling | |
| 5,410,538 A | 4/1995 | Roche et al. | |
| 5,469,469 A | 11/1995 | Haines | |
| 5,521,533 A * | 5/1996 | Swanke | 327/107 |
| 5,521,937 A | 5/1996 | Kondo et al. | |
| 5,539,730 A | 7/1996 | Dent | |
| 5,592,177 A * | 1/1997 | Barrett | 342/361 |
| 5,623,487 A | 4/1997 | Natali | |
| 5,625,641 A * | 4/1997 | Takakusaki | 375/137 |
| 5,838,717 A * | 11/1998 | Ishii et al. | 375/131 |
| 5,862,069 A * | 1/1999 | Nestler | 708/620 |
| 5,886,573 A * | 3/1999 | Kolanek | 330/10 |
| 5,956,345 A | 9/1999 | Allpress et al. | |

(Continued)

FOREIGN PATENT DOCUMENTS

EP 0485108 5/1992

(Continued)

OTHER PUBLICATIONS

International Search Report & Written Opinion of the International Searching Authority from PCT/US2004/040732, Jun. 10, 2005.

(Continued)

*Primary Examiner*—Kevin M Burd
(74) *Attorney, Agent, or Firm*—Brinks Hofer Gilson & Lione

(57) ABSTRACT

Systems and methods are described for hybrid spread spectrum radio systems. A method includes modulating a signal by utilizing a subset of bits from a pseudo-random code generator to control an amplification circuit that provides a gain to the signal. Another method includes: modulating a signal by utilizing a subset of bits from a pseudo-random code generator to control a fast hopping frequency synthesizer; and fast frequency hopping the signal with the fast hopping frequency synthesizer, wherein multiple frequency hops occur within a single data-bit time.

66 Claims, 10 Drawing Sheets

U.S. PATENT DOCUMENTS

| | | | |
|---|---|---|---|
| 6,005,605 A * | 12/1999 | Kostreski et al. | 348/21 |
| 6,005,886 A | 12/1999 | Short | |
| 6,018,528 A | 1/2000 | Gitlin et al. | |
| 6,084,905 A * | 7/2000 | Ishifuji et al. | 375/133 |
| 6,108,317 A * | 8/2000 | Jones et al. | 370/320 |
| 6,188,715 B1 | 2/2001 | Partyka | |
| 6,223,053 B1 | 4/2001 | Friedmann et al. | |
| 6,229,796 B1 | 5/2001 | Dent | |
| 6,243,397 B1 | 6/2001 | Yun | |
| 6,289,038 B1 | 9/2001 | Park | |
| 6,381,053 B1 * | 4/2002 | Fathallah et al. | 398/99 |
| 6,584,140 B1 * | 6/2003 | Lee | 375/132 |
| 6,726,099 B2 * | 4/2004 | Becker et al. | 235/380 |
| 6,853,629 B2 * | 2/2005 | Alamouti et al. | 370/330 |
| 7,142,582 B2 * | 11/2006 | Schilling | 375/134 |
| 7,230,971 B1 * | 6/2007 | Beard | 375/132 |
| 2002/0034191 A1 | 3/2002 | Shattil | |
| 2002/0168937 A1 * | 11/2002 | Clark et al. | 455/41 |
| 2003/0034834 A1 * | 2/2003 | Blodgett | 330/52 |
| 2003/0123383 A1 | 7/2003 | Korobkov et al. | |
| 2003/0165183 A1 | 9/2003 | Ketchum | |
| 2003/0175033 A1 * | 9/2003 | Taga et al. | 398/152 |

FOREIGN PATENT DOCUMENTS

| | | |
|---|---|---|
| EP | 1128624 | 8/2001 |
| JP | 11-41204 | 2/1999 |
| WO | WO00/11823 | 3/2000 |
| WO | WO01/01584 | 1/2001 |
| WO | WO02/27992 | 4/2002 |
| WO | WO03/043235 | 5/2003 |
| WO | WO2005/025074 | 3/2005 |

OTHER PUBLICATIONS

International Search Report & Written Opinion of the International Searching Authority from PCT/US2004/040754, May 10, 2005.

Ezio Biglieri, "Digital modulation techniques" CRC Press LLC, chapter 20, paragraphs 20.1-20.7, 2002.

Benedetto et al., IEEE Engners Sociedade Brasiliera de Teleconumicacoes: "Polarization shift keying: an efficient coherent optical modulation" SBT/IEEE, pp. 0014-0020, Sep. 3, 1990.

International Search Report & Written Opinion of the International Searching Authority from PCT/US2004/040680, Nov. 3, 2005.

Hara et al., "Overview of Multicarrier CDMA" IEEE Communications Magazine, IEEE Service Center, Piscataway, N.J., USA pp. 126-133, Dec. 1997.

Jong et al., "Performance Analysis of coded multicarrier spread-spectrum systems in the presence of multipath fading and nonlinearities", IEEE Transactions on Communications, vol. 49, No. 1, pp. 168-179, Jan. 2001.

Magill, "Multi-carrier modulated orthogonal code-division multiple access (MCM-OCDMA)" in K. Fazel and G.P. Fettweis (eds.) Multi-Carrier Spread-Specturm, Kluwer Academic Publishers, pp. 105-110, 1997.

Harada et al., "Performance analysis of a new multi-code and multi-carrier hybrid transmission scheme for future broadband mobile communication systems" in K. Fazel and G.P. Fettweis (eds.) Multi-Carrier Spread-Specturm, Kluwer Academic Publishers, pp. 41-48, 1997.

International Search Report for PCT/US01/30421, Sep. 10, 2002.

Yang, et al., "Blind Joint Soft-Detection Assisted Slow Frequency-Hopping Multicarrier DS-CDMA" IEEE Transactions on Communications, vol. 48, No. 9, pp. 1520-1529, Sep. 2000.

Enjia, et al. "The Study of FH/MCFD/SSMA/DPSK Wireless Communication Systems" Department of Electronics, Peking University, International Conference on Communication Technology, pp. S18-06-1 through S18-065, Oct. 22, 1998.

Oh, et al. "The Bandwidth Efficiency Increasing Method of Multi-Carrier CDMA and its Performance Evaluation in comparison with DS-CDMA with Rake Receivers" Department of Information & Communication Engineering, Chonbuk National University, Chonju, Korea, pp. 561-565, May 16, 1999.

Nahier, et al., "Das-Multi-Carrier-Spreizspektrumsystem Helex", vol. 72, No. 16, pp. 78-80, Jul. 23, 1999.

Koulakiotis et al., "Comparative study of interference cancellation schemes in multi-user detection", IEE, 1997, pp. 10/1-10/7.

Ortigoza-Guerrero et al., "A dynamic resource allocation strategy for future UMTS", IEEE, 1998, pp. 377-381.

Azad et al., "Multirate spread spectrum direct sequence CDMA techniques", I$$ 1994, pp. 4/1-4/5.

Notice of Allowance mailed Oct. 16, 2009, for U.S. Appl. No. 11/648,021 (7 pages).

Allowed Claims for U.S. Appl. No. 11/648,021 (20 pages).

* cited by examiner

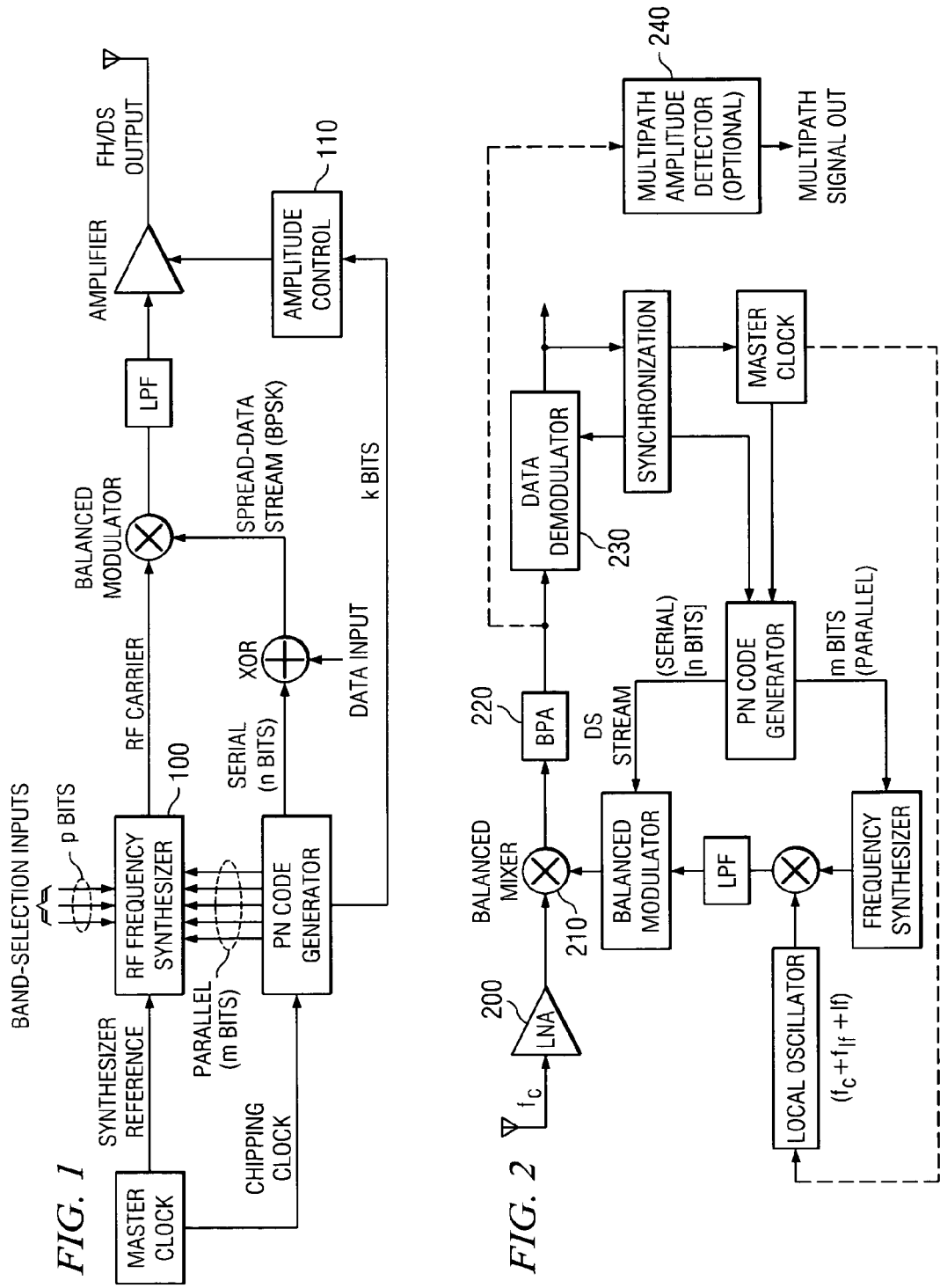

HYBRID SPREAD SPECTRUM RADIO SYSTEM

STATEMENT AS TO RIGHTS TO INVENTIONS MADE UNDER FEDERALLY-SPONSORED RESEARCH AND DEVELOPMENT

The United States Government has rights in this invention pursuant to Contract No. DE-AC05-00OR22725 between the United States Department of Energy and UT-Battelle, LLC.

BACKGROUND OF THE INVENTION

1. Field of the Invention

The invention relates generally to the field of communications. More particularly, the invention relates to spread-spectrum communications.

2. Discussion of the Related Art

Conventional radio-frequency (RF) digital-data transmission schemes are in general highly susceptible to errors caused by multipath propagation and other interference conditions. Historically, direct-sequence spread-spectrum techniques have offered reasonably good immunity against long-path (e.g. outdoor) types of reflections, where the time distribution (dispersion) of the arrival of the individual successive signal reflections is generally greater than the effective chipping period (inverse of the spread-spectrum chipping rate) of the transmitted signal.

Outdoor environments often exhibit delay-dispersion profiles in the range of 3-100 µs (typically ~25 µs RMS maximum [for hilly terrain]) and thus are generally addressed with signal spreading rates of ~1 Mchips/sec (especially when used with time-offset quadrature modulation schemes such as OQPSK); these are in fact very close to the existing parameters of the IS-95 CDMA cellular-telephone system in wide use throughout the U.S. and in many other countries.

For the indoor propagation case, however, the dispersion times are much shorter—typical figures range from 10 to 250 ns, with a median RMS dispersion value of 50 ns. The longer values would imply a minimum spreading rate of ~4 Mchips/sec, while the shorter (worst-case) values call for spreading rates of about 100 Mchips/sec (and, thus, at least 100 MHz of signal bandwidth for standard direct-sequence (DS) signals using conventional binary phase-shift keying (BPSK) or frequency-shift keying (FSK) modulation. For OQPSK schemes as mentioned above, the minimum required bandwidth is halved but is still nevertheless very unwieldy in crowded RF bands.

Obviously, this bandwidth is not reasonably obtainable in any of the available Industrial, Scientific, and Medical (ISM) bands currently allocated for spread-spectrum transmission in the U.S. below 5 GHz (and would require the whole available 100-MHz band for ISM and Unlicensed National Information Infrastructure [U-NII] applications above 5 GHz), so other techniques must be applied to overcome the multipath problem for indoor wireless links. One prevalent option is to employ frequency hopping, so that via the periodic carrier-frequency changes, the signal will hop to frequencies which do not exhibit multipath nulls (destructive interferences) from the transmitter at the desired receiving points. In general, the total received RF energy of many of these data bursts (hops) will be cancelled by the nulls (and thus produce, bad data packets), but generally a majority will be of satisfactory quality to provide reasonably effective link operation.

However, either complex (and delay-inducing) interleaving and/or error-correction coding algorithms (e.g., Reed-Solomon) must be introduced into the link, or numerous packet retransmissions will be required to successfully transport the data payload. In either case, significant levels of latency and concurrent link-rate limitations will inevitably result.

Some methodologies have even been developed to build "hopping tables" of useable (low-error) frequencies in the system-control software, and thereby avoid the frequencies with propagation nulls, but in general as the signal-transmission environment changes with movements of equipment, personnel, and RF interference sources, the set of "bad" frequencies will need to be constantly updated; even so; statistically and practically, some bad packets will nevertheless always be received. Furthermore, the use of "intelligent" hopping schemes which on average avoid certain hopping channels in a coordinated fashion have been historically disallowed by the Federal Communications Commission (FCC) on the ISM bands, since the average channel occupancy would be nonuniform and thereby skew the normal long-term random signal-frequency statistics intended for ISM-band frequency-hopping system operation, resulting in a statistical increase in interference to other users (although via rules changes by the FCC in the last few months, this prohibition has been somewhat relaxed). Overall, however, this scheme, although usually workable for fixed devices, generally fails in mobile applications or when the RF environment is dynamic, since the positions of the multipath nulls (and thus the sets of "bad" channels) are constantly changing.

Heretofore, the requirements of a more robust scheme (fewer data errors) which will function effectively even in severe multipath environments (e.g., highly RF-reflective areas) and yet avoid the introduction of either extremely complex error-correction hardware with substantial latency (delay) into the transmission process and/or the-requirement for frequent retransmissions, plus offering a solution to the issue of link latencies (which can be particularly significant in high-speed control applications where the delays can cause loop-stability problems for the RF-in-the-loop systems referred to above) have not been fully met. For operation in the United States, the scheme must additionally comply with FCC Part 15 regulations for the ISM and U-NII bands by guaranteeing adequately random spectral characteristics of its transmissions at all times.

Still another essential aspect of modem RF telemetry systems is that of efficient power utilization. It is desirable to operate many distributed devices, including sensors, alarm systems, RFID tags, and the like from low-cost, compact battery sources for maintenance-free intervals of 1 to about 5 years (or even longer). It is therefore highly desirable to provide a system RF telemetry-protocol which achieves reliable data transmission with an absolute minimum of remote-device power consumption.

Yet another critical need in many systems is to simultaneously operate a large number of RF devices (such as tags, sensors, and the like) in a proximal area without significant-statistical levels of mutual interference; in common parlance, this is the familiar multiple-access problem which is handled by well known frequency-, time-, or code-division multiplexing or multiple-access techniques (typically referred to as FDMA, TDMA, and CDMA, respectively). However, these methods have not hitherto been simultaneously employed in a programmably or adaptively coupled or coordinated fashion to provide a useful increase in the permissible number of devices operable in a given area for a specific amount of mutual interference.

Still another need is for an RF signal-transmission technique which even in the presence of multipath and multi-user interference can support an accurate radiolocation function where the respective locations of the RF devices can be readily detected, such as for equipment, container, and personnel tracking.

Another key need is for an RF signaling protocol which offers improved transmission security against reception, decoding, or even detection by unauthorized parties.

Finally, a need exists for an RF signaling technique which also provides a high degree of signal programmability and adaptability to rapidly accomplish tradeoffs in the DS code lengths, frequency- and time-hopping patterns, and the interrelationships thereof to effectively address dynamic signal and device-use conditions (e.g., changing multipath and RFI conditions and system functional requirements).

What is needed, then, is a solution that addresses all of these requirements.

SUMMARY OF THE INVENTION

There is a need for the following embodiments. Of course, the invention is not limited to these embodiments.

According to a first aspect of the invention, a method comprises: modulating a signal by utilizing a subset of bits from a pseudorandom code generator to control an amplification circuit that provides a gain to the signal. According to a second aspect of the invention, an apparatus comprises: a pseudorandom code generator; and an amplitude controller coupled to the pseudorandom code generator. According to a third aspect of the invention, a method comprises: directly synthesizing a digital signal including: amplitude modulating an output channel with a four-quadrant amplitude multiplier to provide an amplitude dithered signal. According to a fourth aspect of the invention, an apparatus comprises a direct digital synthesizer including a four-quadrant amplitude multiplier, wherein the direct digital synthesizer provides an amplitude dithered signal. According to a fifth aspect of the invention, a method comprises: directly synthesizing a digital signal including: amplitude modulating an "in-phase" (I) channel with a first four-quadrant amplitude multiplier; and amplitude modulating a "quadrature-phase" (Q) channel with a second four-quadrant amplitude multiplier. According to a sixth aspect of the invention, an apparatus comprises: a direct digital synthesizer including a first four-quadrant amplitude multiplier and a second four-quadrant amplitude multiplier, wherein the first four-quadrant amplitude multiplier and the second four-quadrant amplitude multiplier are coupled together in parallel. According to a seventh aspect of the invention, a method comprises: modulating a signal by utilizing a subset of bits from a pseudo-random code generator to control a fast hopping frequency synthesizer; and fast frequency hopping the signal with the fast hopping frequency synthesizer, wherein multiple frequency hops occur within a single data-bit time. According to an eight aspect of the invention, an apparatus comprises: a pseudo-random code generator; and a fast hopping frequency synthesizer coupled to the pseudo-random code generator, wherein multiple frequency hops occur within a single data-bit time.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

FIG. 1 illustrates a block schematic view of a hybrid frequency-hopping/direct-sequence spread-spectrum transmitter (BPSK-modulated), representing an embodiment of the invention.

FIG. 2 illustrates a block schematic view of a hybrid frequency-hopping/direct-sequence spread-spectrum receiver (BPSK-modulated), representing an embodiment of the invention.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

The below-referenced U.S. Patents disclose embodiments that were satisfactory for the purposes for which they are intended. The entire contents of U.S. Pat. Nos. 6,556,942; 5,623,487; 5,521,937; 5,274,665; and 4,550,292 are hereby expressly incorporated by reference herein for all purposes. The entire contents of allowed U.S. patent application Ser. No. 09/671,636, filed Sep. 27, 2000, in which the issue fees have been paid, are hereby expressly incorporated by reference herein for all purposes.

Figure 13:
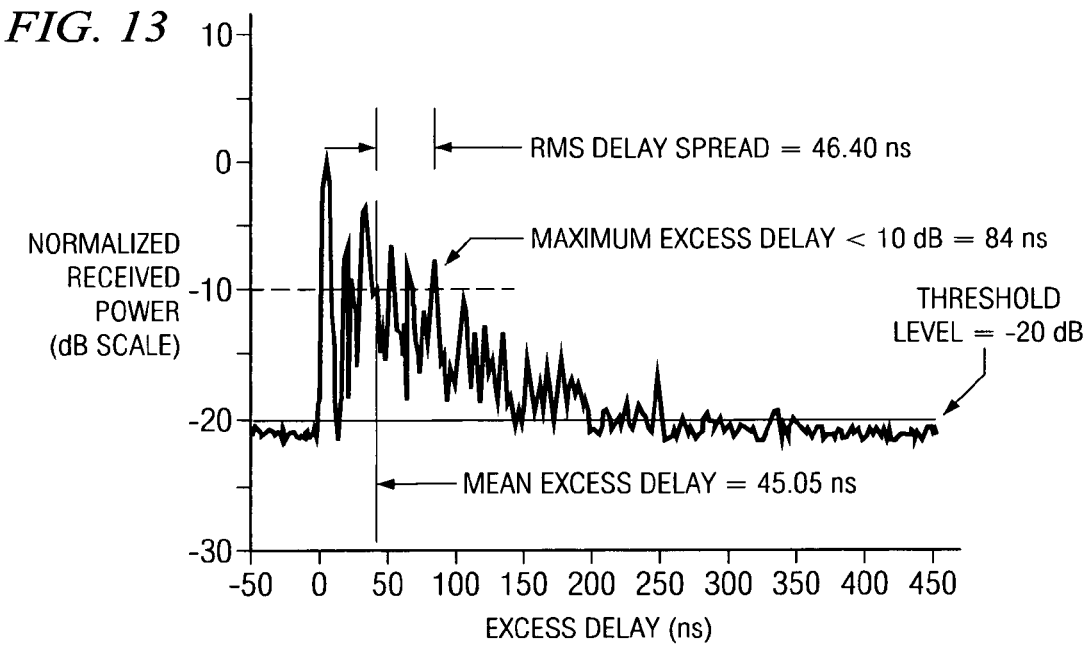
FIG. 13 illustrates a typical indoor RF propagation environment via its characteristic signal-delay profile.
Figure 14:
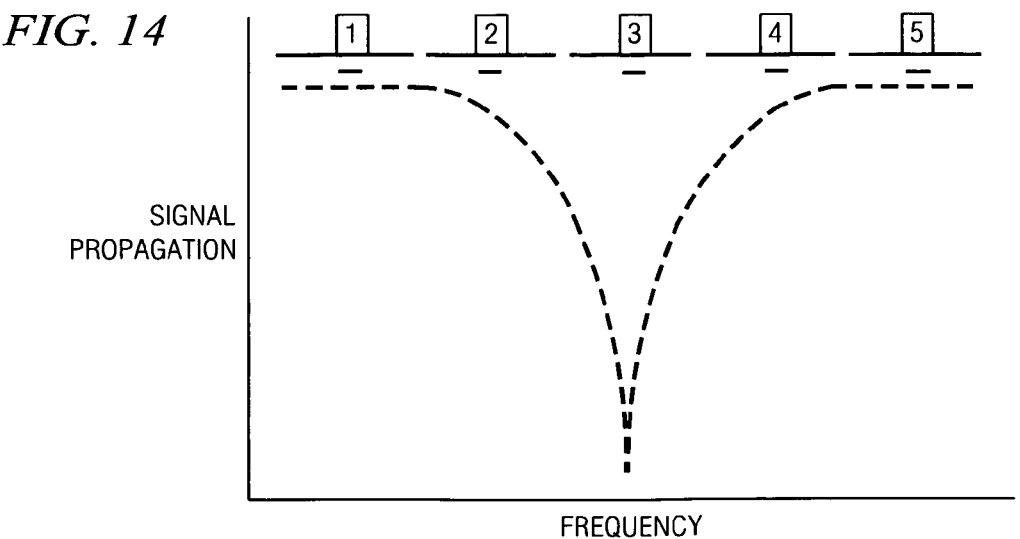
FIG. 14 depicts a representative moderately sharp multipath cancellation null typical of indoor RF environments, with a superimposed set of five hybrid spread-spectrum signals of medium bandwidth, representing an embodiment of the invention.

The invention can include the specific code-related combination of standard direct-sequence (DS) spread-spectrum (SS) modulation with "fast" frequency hopping (FFH), wherein multiple frequency hops occur within a single data-bit time. Specifically, the most significant benefit to fast frequency hopping is that each bit is represented by chip transmissions at multiple frequencies. If one or more chips are corrupted by multipath or interference in the RF link, statistically a majority should still be correct. Indeed, with suitable error detection, if even one chip is correct, the original data bit can still be recovered correctly. [Standard or "slow" frequency hopping (SFH or simply FH), in contrast, transmits at least one and usually several data bits in each hopping interval.] In the invention, alternatively, for example, the hopping can be augmented or replaced by frequency sweeps or "chirps" of an unconstrained or constrained (i.e., continuous-frequency and/or continuous-phase) nature. The difficult indoor RF propagation environments typical of offices and large industrial spaces dictate that highly robust techniques are necessary for good link performance. The multiple signal reflections cause significant deterioration of conventional signals and attendant high data-error rates. The temporal plot of FIG. 13 illustrates a typical indoor RF propagation environment via its characteristic signal-delay profile. Note that the RMS delay spread (the time signal reflections from the walls, ceiling, and floor are still arriving at the antenna) is nearly 50 ns; without special RF signaling techniques, this will cause major data errors unless the information rate is very low. Even conventional spread-spectrum links will need greater than 20 MHz of bandwidth for successful operation in this venue. The effect of multipath can also be clearly seen in the frequency-domain plot of FIG. 14, which depicts a representative moderately sharp multipath cancellation null (typical of indoor RF environments) near the center of signal band ③, with a superimposed set of five hybrid spread-spectrum signals of medium bandwidth (① through ⑤). Due to the propagation null, signal band ③ is essentially blocked, bands ② and ④ are somewhat attenuated (and distorted due to the spectral tilting), while bands ① and ⑤ largely unaffected. Clearly, by using multiple frequencies, the probability of getting the data through correctly is much greater than in conventional systems.

A significant further advantage of the fast-hopping aspect of the invention is that of multipath "avoidance": this can be appreciated by observing that in a multiple-reflection environment as depicted in FIG. 13, if the time between successive signal hops is less than that between the successively received reflections, then there will be very little opportunity for the later signal arrivals to cause destructive interference when combined with the earlier paths; this, of course can (depending on the particular delay profile of the area) require fairly high hopping rates, though this requirement can also be somewhat ameliorated by the presence of the DS component in the composite HSS signal.

Still another aspect of the invention is in the high degree of programmability of the different facets of the HSS signal in the preferred implementations; here, the complete software/firmware direction of the DS spreading (chipping) rate, the FH hopping rate, carrier frequencies, and time/frequency profiles, plus the interrelated or independent time-hopping (TH) and/or polarization control, provides an hitherto unattainable degree of signal programmability and adaptability to rapidly and efficiently accomplish tradeoffs in the DS code lengths, frequency- and time-hopping patterns, signal polarization, and the interrelationships thereof to effectively address dynamic signal and device-use conditions (e.g., changing multipath and RFI conditions and system functional requirements).

Excellent signal security is another advantage of the invention: since so many signal parameters can change in a rapid fashion, and since successful synchronization requires substantial a priori knowledge of the code relationships between the DS, FH, TH, and polarization components of the HSS signal, the unintended listener will experience great difficulty in fully synchronizing with the HSS transmission and decoding the embedded data. An even higher level of HSS signal security can be achieved by dynamically altering the PN code relationships within the HSS transmitter; this can take the form of rolling code segments, scrambling of the code vectors, or table-based reassignments of the bit-pattern relationships. Obviously, the degree of difficulty in intercepting such a complex transmission without the required code "keys" or indices is extreme; of course, standard data-encryption techniques may also be added in addition to the above to provide even greater security of the transmitted data.

Still another major issue solved by the invention is that of efficient multiple access: in a proximal area, often dozens to hundreds or even thousands of devices (e.g., wireless sensor nodes, RFID tags, alarm units, and the like) are required to interoperate without significant data loss due to RF interference, multipath, or collisions from other devices in the group. Appropriately programmed HSS can exhibit superior multiple-access performance to even full power-controlled CDMA systems (e.g., cell phones) due to the concatenation of DS-CDMA techniques with the additional dimensions of the FH and TH modulations. These added signal dimensions permit greater diversity, access for more users, and/or can substantially ease the need for high accuracy in the CDMA power-control function. Moreover, the improved flexibility of the invention can support transmit-only devices which cannot be power-controlled and thus are not amenable to operating in a true CDMA-only environment. Since the multiple-access interference caused by the uncontrolled power levels of these units quickly exceeds tolerable limits for CDMA operation, especially with varying device locations (and, thus, the classic near-far problem for DS systems), the HSS protocol of the invention offers an effective means of accommodating such uncontrolled, randomly transmitting one-way units without adversely affecting the overall system multiple-access operations. This is principally accomplished by assigning specific CDMA codes to such devices and constraining their hopping frequency and time sequences to statistically avoid the more conventional (power-controlled) units' transmission slots.

In addition, to provide higher performance in typical multipath-prone industrial, military, and commercial wireless signal propagation environments, the capability to perform a continuous-phase (CP) synthesis of the combined DS/FFH signal waveform permits more effective utilization of RF spectrum (narrower bandwidth control and avoidance of transient spectral "splatter") and simultaneously the potential for faster, more stable receiver synchronization in adverse transmission environments.

A further aspect of the invention is the application of statistically amplitude-dithered modulation and/or statistical polarization control of the combined CP-DS/FFH signal via pseudorandom-polynomial techniques to provide even more immunity to multipath-induced signal cancellations, which typically cause dropouts and accompanying high rates of data errors. The use of amplitude dithering minimizes the effect of successive chip cancellations due to closely spaced destructive signal reflections in low-loss (e.g., metal-walled) RF environments. It can be used to perturb or "break up" multipath-induced signal nulls where the signal is effectively cancelled by the destructive interferences due to unfortunate combinations of multiple reflected signals from diverse paths. When the vector sum of the multiple components approaches zero, by rapidly changing the amplitude of the transmitted signal (within the time-frame of the successively received reflection signals), the cancellation of the multiple-path signals can at least partially be "undone", leaving a reasonable amount of instantaneous signal amplitude at the receiver to decode. To achieve maximum error-reduction benefit independently from this amplitude-dithering technique, the time rate of dithering (amplitude changing) should be at least comparable to the rate of arrival of successive reflected signals at the designated receiver (and ideally somewhat greater); this, in turn, still requires a fairly high dither rate unless combined with other aspects of the invention.

The application of PN-code controlled polarization control, when properly synchronized between transmitter and receiver(s), provides even greater signal diversity and, thus, immunity against multipath-induced signal nulls and dropouts (as well as unauthorized signal reception). This is accomplished by altering the transmitted signal wave polarization as a function of a specified PN code; with different orientations of the signal electric (E) and magnetic (H) fields, the respective reflection coefficients at room boundaries and other interfaces will also change, thus shifting (or "dithering") the multipath null depths, frequencies, and locations. As will be described in later examples, the programming of the effective transmitted signal polarization can be accomplished by the concurrent control of the relative ratio of the power sent to two orthogonally polarized antennas, typically one vertical and the other horizontal.

Often the concatenation of some, most or all of the aforementioned methodologies will be required to provide a highly reliable link suitable for critical commercial, industrial and/or military applications in adverse (i.e., multipath- and interference-prone) RF environments. Although there are a multitude of possible specific board-level implementations of the hybrid spread-spectrum (HSS) modulator and/or demodulator, the most practical, compact, and cost-effective form is certainly that involving highly integrated custom integrated-circuit (IC) chip(s) to achieve the desired system functionality, programmability, size and reasonable power consumption characteristics at a usefully low cost.

All the aforementioned features (with the possible exception-of the antenna polarization control at higher power levels) can be readily implemented in monolithic integrated-circuit form to provide a highly robust, low-cost digital transmission device for a multitude of industrial, commercial and military wireless applications.

Numerous direct-digital synthesizers (DDS) devices have appeared on the market which are generally suitable to form the core of a practical hybrid spread-spectrum transmission system according to the present invention, although obviously none can simultaneously achieve all of the required functions. Perhaps the closest commercially available device so far is the Analog Devices AD9854, which includes a continuous-phase RF frequency synthesizer which can be frequency-ramped or swept and/or downstream phase-modulated as desired. The digitally modulated carrier phase data is internally converted to parallel in-phase ("I") and quadrature-phase ("Q") digitized waves. Each is optionally passed through an inverse-sinc response FIR filter (to compensate for the frequency-response deviations caused by the signal sampling/digitization process) and a downstream amplitude-control multiplier and finally converted to analog voltages by a pair of high-speed digital-to-analog converters (DACs).

Unfortunately, several features needed to fully synthesize the HSS format are not included in the AD9854 (or any other currently available commercial device, either); these include separate phase-modulator blocks upstream from the I and Q phase-to-amplitude converters [sine- and cosine-formatted read-only memory (ROM) blocks]; full four-quadrant high resolution (e.g., 14-bit or better) amplitude modulators (multipliers) ahead of the DACs, or alternatively, high-accuracy two-quadrant multiplying DAC structures; a fast, wide (i.e., 32-bit or greater) parallel programming and data interface to support high chipping rates and/or hopping/chirping rates; and sufficient fast on-chip parameter caching to complement the parallel interface speed and thereby achieve the desired rapid (i.e., $\geqq$10-MHz) internal synthesizer parameter reprogramming rates.

A practical, moderately fast HSS system implementation achievable with currently available devices includes: an AD9854; standard clock circuitry; an external DSP control device, high-speed field-programmable gate arrays (FPGAs) for parallel data interfacing; two fast external downstream analog multipliers (e.g., Analog Devices AD834s); and a final RF output signal combiner to sum the I- and Q-channel modulated signals from the multipliers. With a 300-MHz version of the AD9854 chip, RF output bandwidths of up to 120 MHz are achievable for wideband I/Q upconversion to a convenient RF transmission band; alternatively, a standard but wide-bandwidth surface acoustic wave (SAW) IF bandpass filter (e.g. 36-MHz width at a 70-MHz center frequency) can be employed with a separate frequency-synthesized upconverter to produce the generally higher spans required to cover the standard 2.45- and 5.7-GHz ISM and the 5.1- and 5.3-GHz U-NII unlicensed RF transmission bands. (For the narrower 902-928 MHz ISM band, a simple fixed upconverter could be substituted for the separate synthesizer stage.)

EXAMPLES

Specific embodiments of the invention will now be further described by the following, nonlimiting examples which will serve to illustrate in some detail various features. The following examples are included to facilitate an understanding of ways in which the invention may be practiced. It should be appreciated that the examples which follow represent embodiments discovered to function well in the practice of the invention, and thus can be considered to constitute preferred modes for the practice of the invention. However, it should be appreciated that many changes can be made in the exemplary embodiments which are disclosed while still obtaining like or similar result without departing from the spirit and scope of the invention. Accordingly, the examples should not be construed as limiting the scope of the invention.

Example 1

Referring to FIGS. 1-2, a hybrid frequency-hopping/direct-sequence (FH/DS) spread-spectrum scheme is depicted.

A hybrid frequency-hopping/direct-sequence (FH/DS) spread-spectrum transmitter depicted in FIG. 1 is configured for standard BPSK data modulation. A subset of m bits from the full n-bit (n>m) PN code is used in synchronization with the chipping sequence to drive an RF synthesizer 100 to generate the exact RF carrier frequency desired for the hybrid SS transmission. Note that an additional p higher-order bits in the RF synthesizer (DDS) frequency-control word are used to specify the RF operating band; the lower-order m bits from the PN register select the individual hopping channels. The precise mapping of hopping frequencies in the RF synthesizer 100 can be handled straightforwardly via a ROM map or within an FPGA or equivalent device. The latter-implementations are particularly useful when implementing fast frequency hopping or for very high data throughput and/or chipping rates.

Figure 11:
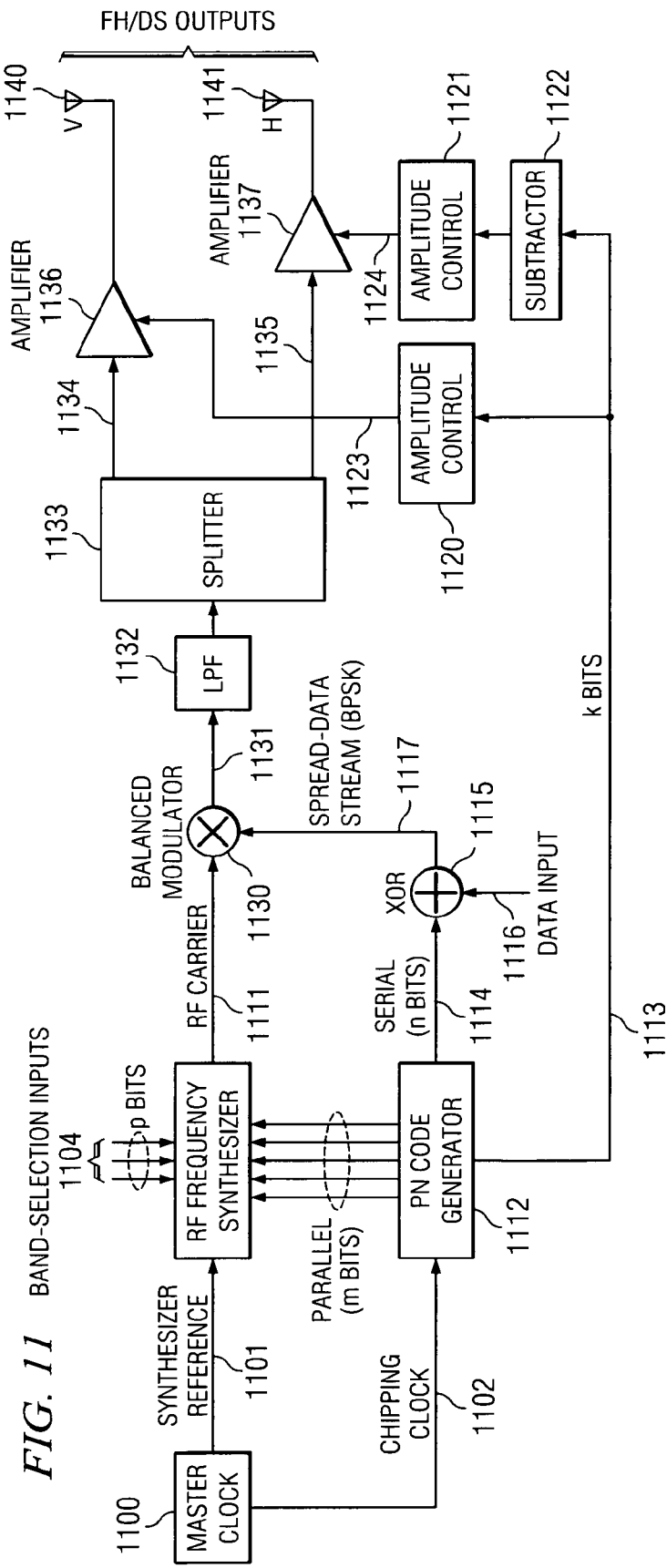
FIG. 11 provides a block diagram of an RF transmitter system incorporating an RF signal polarization-control circuit, representing an embodiment of the invention.

An amplitude control 110 depicted can be directly applied (as shown) to modulate or control the transmitter final RF output power; additionally or alternatively, the dithered amplitude data, generally obtained as k lines (parallel bits) from the PN generator, can be used to control feed power levels to antennas of orthogonal polarizations (i.e., horizontal and vertical) to provide improved signal diversity in the RF environment, as also depicted in FIG. 11. There are numerous possible implementations of this amplitude control, including (but not limited to) classical high- and low-level AM modulators, pulse-width modulation (PWM) control of the supply voltage feeding the final RF amplifier(s), transformer-summed Class-C or -E amplifier stages, and so forth. Alternatively, any incidental amplitude variations in the output signal are often undesirable for many environments, and constant-envelope modulation techniques are to be preferred where higher RF power-amplifier efficiency (e.g., Classes C, D, E, F, or S) is desired. Further, in high-multipath scenarios, a constant-envelope transmitted HSS signal will permit improved signal processing by the receiver, as explained later in the text describing FIG. 12.

The corresponding hybrid FH/DS spread-spectrum receiver architecture is shown in FIG. 2. Here, the incoming hybrid signal is amplified in a front-end low-noise amplifier (LNA) 200, down-converted to the desired intermediate frequency (F) via a balanced mixer 210, amplified and bandpass filtered in a bandpass amplifier (BPA) block 220, and finally demodulated in a conventional manner via a typical bit-wise matched-filter or correlator structure 230. As in the transmitter above, m bits from the n-bit PN code generator (though typically offset by a fixed amount from those in the transmitter to provide the desired IF difference frequency) are used to select the desired hopping channels within the selected RF receiving band.

A fixed local-oscillator signal is used to up-convert (preferably in an image-cancelling, single-sided ["SSB"] mode) the synthesizer output frequency to the appropriate value to produce the target IF; this final programmable FH/DS local oscillator signal is modulated by the PN polynomial code sequence and applied to the balanced mixer 210. This spread signal is then (when properly synchronized) automatically despreads the DS portion of the incoming hybrid signal; the hopping of the local signal also removes the FH component, leaving a simple data-modulated single-frequency signal at the input to the bandpass IF amplifier chain 220. Synchronization for the system is derived from the data stream, the RF carrier frequency, or a combination thereof. An optional multipath-amplitude detector block 240 can provide a relative measurement of the amount of multipath-caused disturbances in the received signal. This is typically implemented via detection of variations in the received-signal's envelope (amplitude), which are utilized by separate signal-processing circuitry to estimate the multipath-induced degradations in the incoming signal and perform at least a first-order cancellation thereof to improve final data quality at the receiver's output.

Example 2

Figure 3:
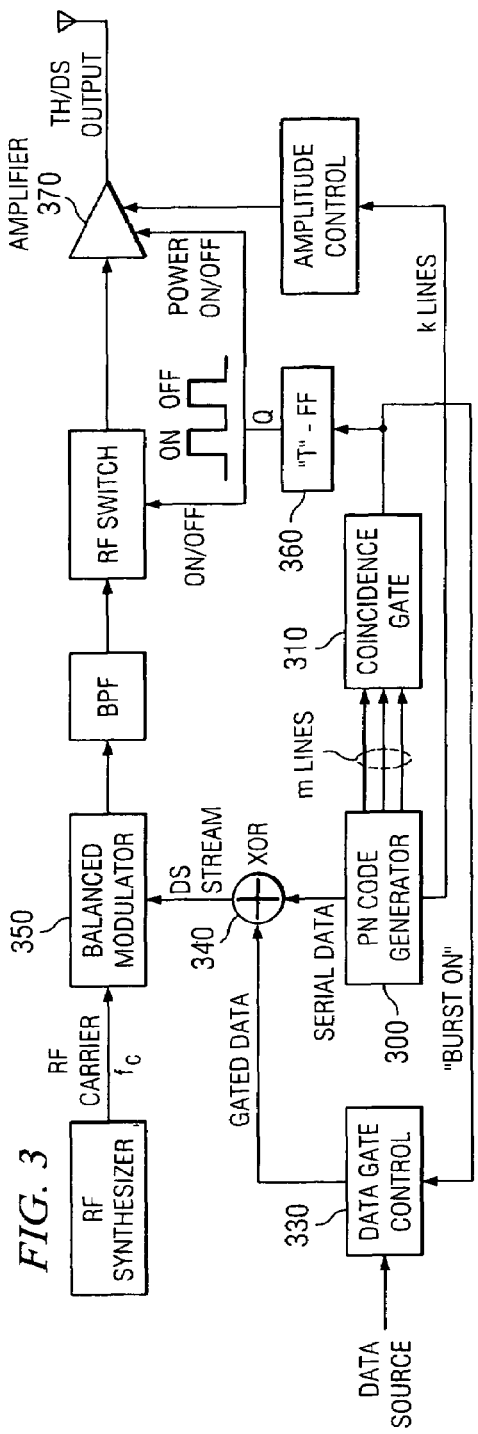
FIG. 3 illustrates a block schematic view of a hybrid time-hopping/direct-sequence spread-spectrum transmitter, representing an embodiment of the invention.
Figure 4:
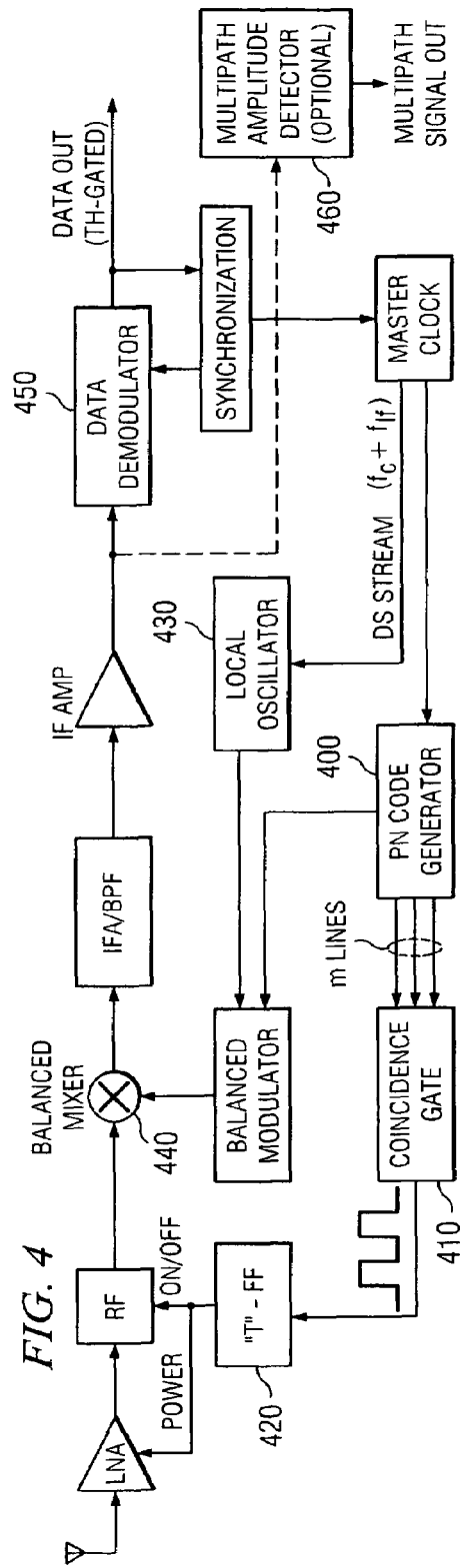
FIG. 4 illustrates a block schematic view of a hybrid time-hopping/direct-sequence spread-spectrum receiver, representing an embodiment of the invention.

Referring to FIGS. 3-4, a hybrid time-hopping/direct-sequence (TH/DS) spread-spectrum scheme is depicted.

A hybrid time-hopping/direct-sequence (TH/DS) spread-spectrum transmitter is represented by FIG. 3. Here, as in the previous TH/DS transmitting scheme, the main PN code generator 300 of n bits also provides a subset of m bits to a pattern-detecting coincidence gate 310. When the selected m-bit pattern is recognized, a data-gate control unit 330 gates a burst of data bits into the DS spreader (via an exclusive-OR gate 340 feeding a balanced modulator 350). Simultaneously, a trigger ("T") flip-flop 360, in essence driven by the coincidence output line, gates on a final RF power amplifier 370 for the prescribed interval (plus small power-up and power-down times) to complete the time-hopped burst transmission.

The corresponding hybrid TH/DS spread-spectrum receiver architecture is shown in FIG. 4. Here, the TH/DS receiver is similar to the FH/DS receiver unit described earlier, except that the m bits extracted from a master PN generator 400 drive a coincidence detector 410 like the one in the transmitter above rather than a frequency synthesizer. A "T" flip-flop 420 in this case, once the system is synchronized, simply gates off the RF input until the desired time slot occurs, which minimizes receiver operating power requirements as well as the effects of non-time-synchronized interfering signals. As before, a local oscillator 430 is modulated by the regenerated, synchronized PN code. The IF signal produced at the output of a receiving balanced mixer 440 stage is both down-converted and despread; a bit-wise data demodulator 450 then directly extracts the gated output stream. An optional multipath-amplitude detector block 460 can as above provide a relative measurement of the amount of multipath-caused disturbances in the received signal.

Example 3

Figure 5:
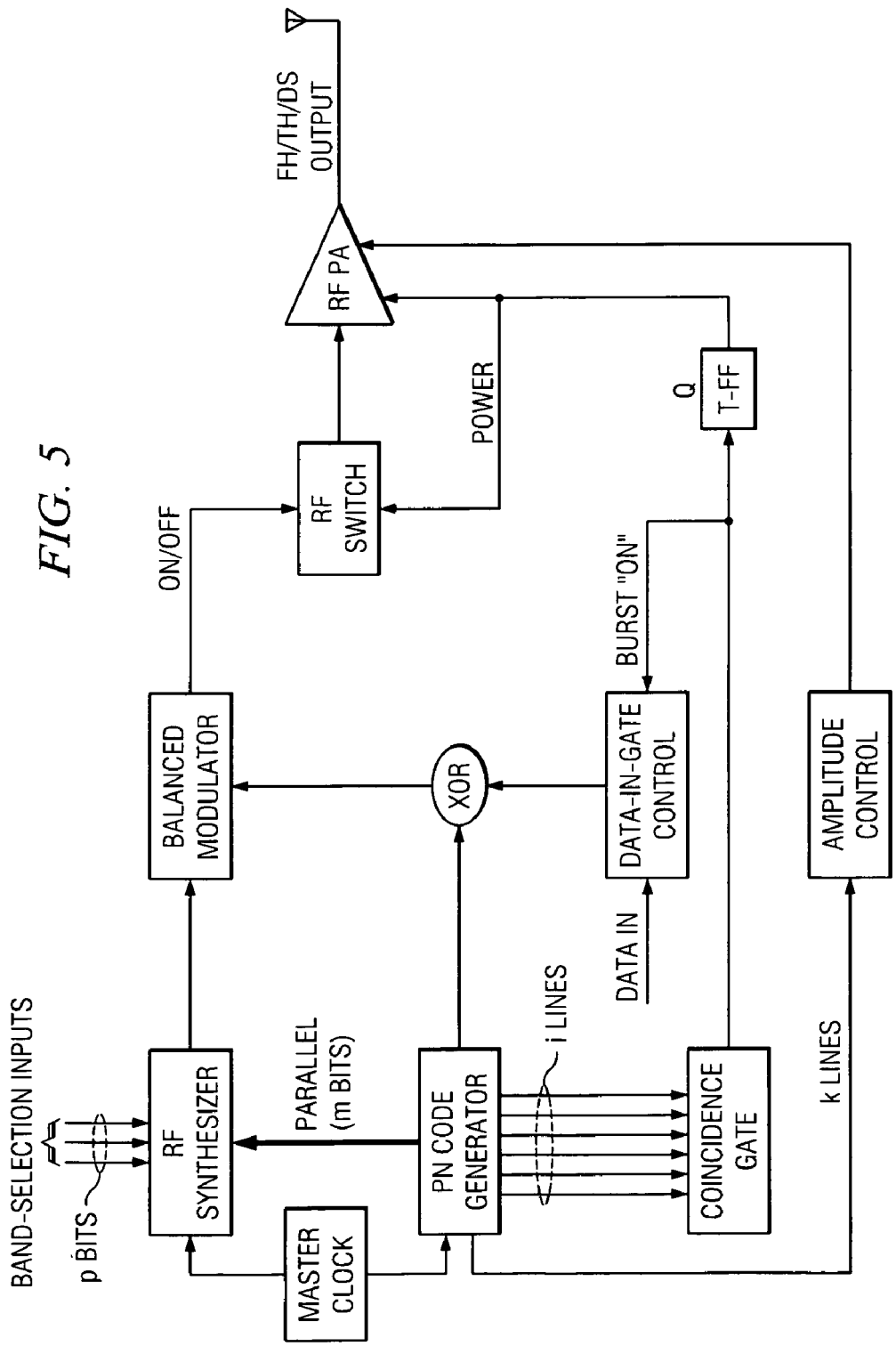
FIG. 5 illustrates a block schematic view of a hybrid frequency-hopping/time-hopping/direct-sequence spread-spectrum transmitter, representing an embodiment of the invention.
Figure 6:
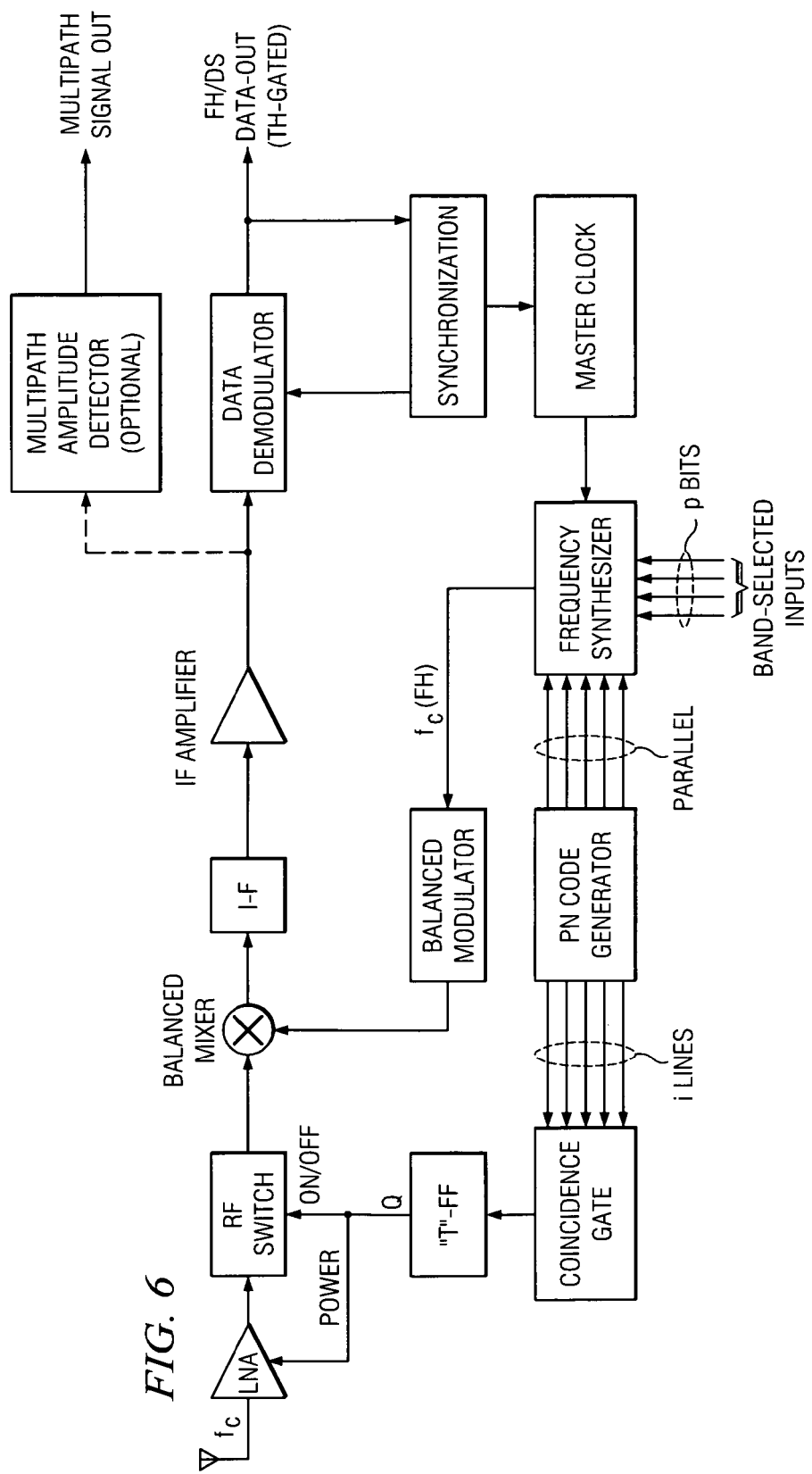
FIG. 6 illustrates a block schematic view of a hybrid frequency-hopping/time-hopping/direct-sequence spread-spectrum receiver, representing an embodiment of the invention.

Referring to FIGS. 5-6, a hybrid frequency-hopping/time-hopping/direct-sequence (FH/TH/DS) spread-spectrum scheme is depicted. The hybrid FH/TH/DS transmitter (FIG. 5) and receiver (FIG. 6) combine both FH/DS and TH/DS schemes to achieve more complex spreading distributions and afford even higher data security than the simpler types; the specific circuit details follow those in the previous diagrams.

These hybrid (FH/TH/DS) types of systems are probably the most useful for practical burst-mode wireless-sensor devices for difficult industrial RF environments. Alternatively, the bursts may be timed in a periodic rather than pseudorandom manner (thus, obviously, eliminating the true TH modulation component) when system update rates need to be highly regular, or when standard periodic time-slotting is desired.

Although these depicted transmitter implementations employ final RF carrier-frequency data-modulation methods, IF-modulation may alternatively be efficiently utilized, particularly since many highly integrated DDS devices are available for popular IF frequency ranges (e.g., 70 MHz). Of course, the IF modulator in such systems will be followed by a frequency-upconverting stage or subsystem to generate the final RF carrier. Dual-stage synthesizer architectures may-be required for some IF-output DDS implementations to provide the full RF output frequency range when that exceeds available standard IF filter bandwidths. If should be noted that the various transmitter and receiver block diagrams merely depict functional arrangements to illustrate the signal-processing concepts; as such, they do not attempt to cover the complete range of configurations possible under the numerous aspects and/or implementations of the invention.

Example 4

Figure 7:
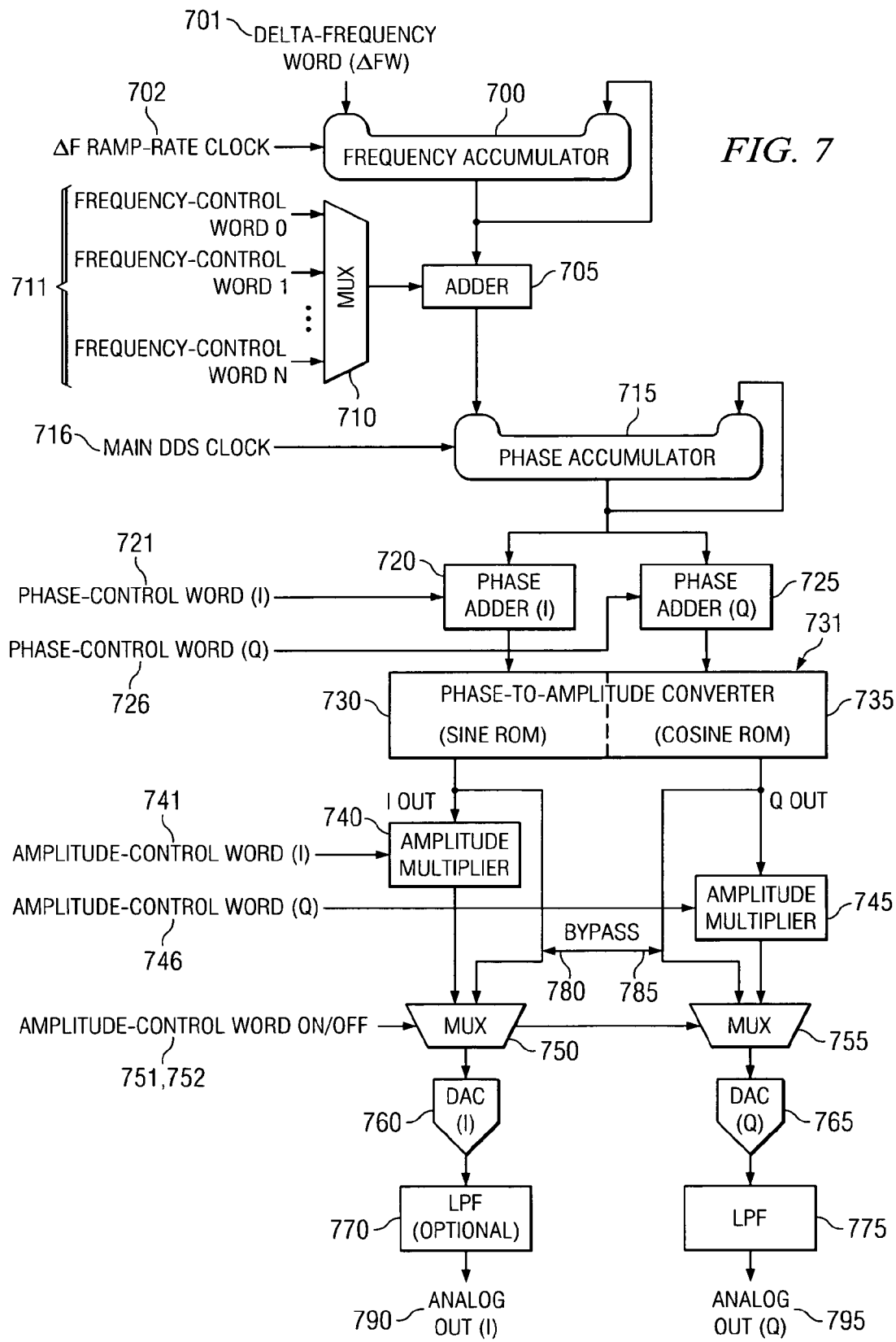
FIG. 7 illustrates a block schematic view of a hybrid programmable direct-digital synthesizer (DDS) transmitter, representing an embodiment of the invention.

Referring to FIG. 7, a hybrid programmable DDS transmitter capable of generating hybrid spread-spectrum signals is depicted. A frequency accumulator 700 is electrically coupled to an adder 705 and to itself 700 (as feedback). A digital signal multiplexer (MUX) 710 is also electrically coupled to the adder 705. The adder 705 is electrically coupled to a phase accumulator 715. The phase accumulator 715 is electrically coupled to: i) itself 715 (as feedback); ii) a phase adder (I) 720; and iii) a phase adder (Q) 725. The phase adder (I) 720 is electrically coupled to a Sine ROM 730 of a phase-to-amplitude converter 731. The phase adder (Q) 725 is electrically coupled to a Cosine ROM 735 of the phase-to-amplitude converter 731.

Still referring to FIG. 7, the Sine ROM 730 of the phase-to-amplitude converter 731 is electrically coupled to an amplitude multiplier 740 and to a bypass circuit 780. The Cosine ROM 735 of the phase-to-amplitude converter 731 is electrically coupled to an amplitude multiplier 745 and to a bypass circuit 785. The bypass circuit 780 is electrically coupled to a MUX 750. The amplitude multiplier 740 is also electrically coupled to the MUX 750. The bypass circuit 785 is electrically coupled to a MUX 755. The amplitude multiplier 745 is also electrically coupled to the MUX 755. The MUX 750 is electrically coupled to a DAC (I) 760. The DAC (I) 760 is electrically coupled to an LPF 770. The LPF 770 is electrically coupled to an analog output (I) 790. The MUX 755 is electrically coupled to a DAC (Q) 765. The DAC (Q) 765 is electrically coupled to an LPF 775. The LPF 775 is electrically coupled to an analog output (Q) 795.

Still referring to FIG. 7, a set of lines utilized to control the hybrid programmable DDS transmitter is also depicted. A delta-frequency word line 701 is electrically coupled to the frequency accumulator 700. A delta-frequency ramp-rate clock line 702 is electrically coupled to the frequency accumulator 700. A set of frequency-control word lines 711 is electrically coupled to the MUX 710. A main DDS clock line 716 is electrically coupled to the phase accumulator 715. A phase-control word (I) line 721 is electrically coupled to the phase adder (I) 720. A phase-control word (Q) line 726 is electrically coupled to the phase adder (Q) 725. An amplitude control word (I) line 741 is electrically coupled to the amplitude multiplier 740. An amplitude control word (Q) line 746 is electrically coupled to the amplitude multiplier 745. An amplitude control word on/off (I) line 751 is electrically coupled to the MUX 750. An amplitude control word on/off (Q) 752 is electrically coupled to the MUX 755.

Example 5

Figure 8:
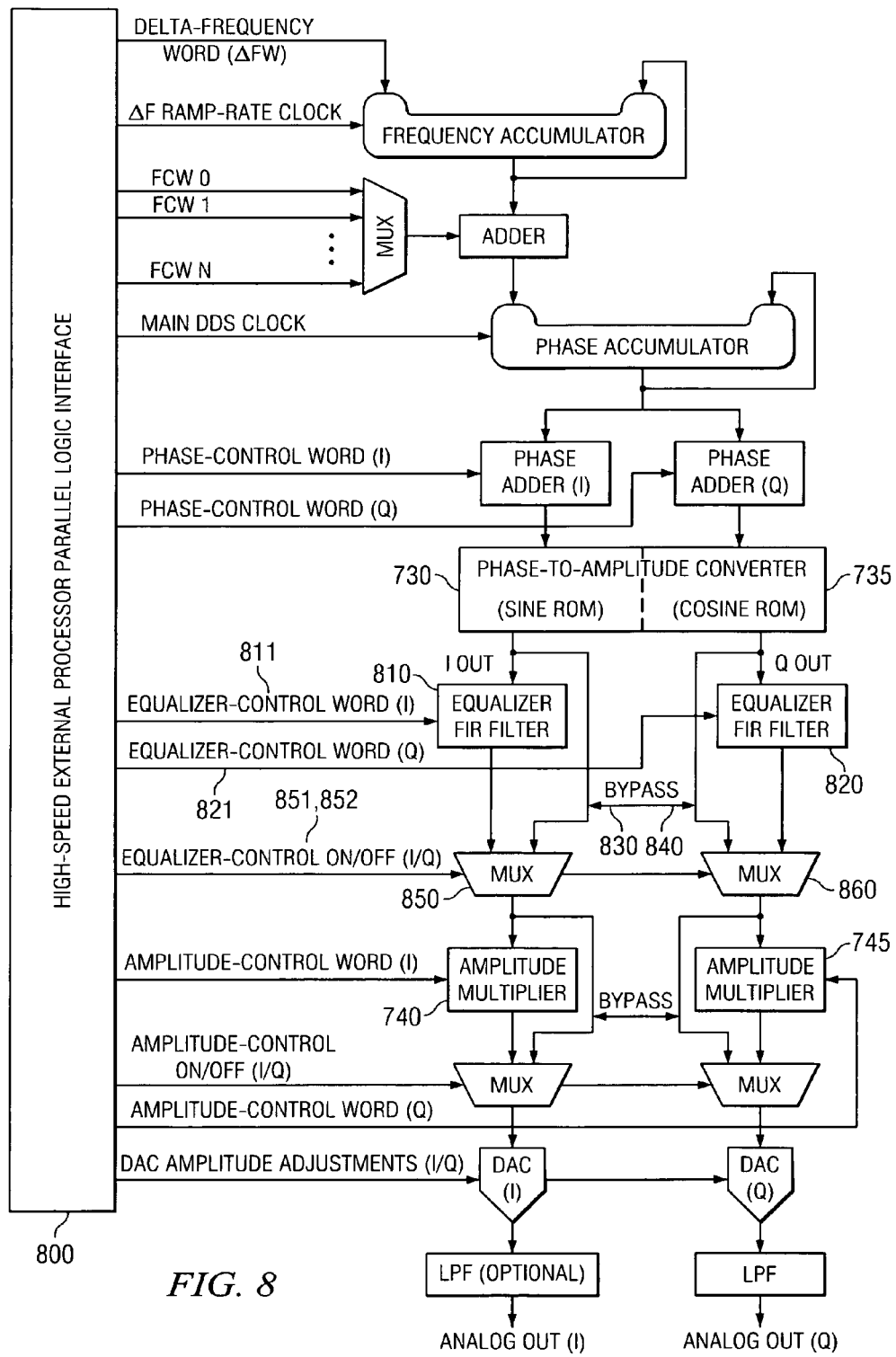
FIG. 8 illustrates a block schematic view of a hybrid programmable direct-digital synthesizer (DDS) transmitter with external interface, representing an embodiment of the invention.

Referring to FIG. 8, a hybrid programmable DDS transmitter with external interface is depicted. The configuration is similar to the one in described for FIG. 7, with the following modifications: the sine ROM 730 is electrically coupled to an equalizer FIR filter 810 and to a bypass circuitry 830. The cosine ROM 735 is electrically coupled to an equalizer FIR filter 820 and to bypass circuitry 840. The equalizer FIR filter 810 is electrically coupled to a MUX 850. The bypass circuitry 830 is also electrically coupled to the MUX 850. The equalizer FIR filter 820 is electrically coupled to a MUX 860. The bypass circuitry 840 is also electrically coupled to the MUX 860. The MUX 850 is electrically coupled to the amplitude multiplier 740. The MUX 860 is electrically coupled to the amplitude multiplier 745.

Still referring to FIG. 8, a set of lines utilized to control the hybrid programmable DDS transmitter is similar to the one described for FIG. 7, with the following additions: an equalizer control word (I) 811 is electrically coupled to the equalizer FIR filter 810. An equalizer control word (Q) 821 is electrically coupled to the equalizer FIR filter 820. An equalizer control on/off (I) line 851 is electrically coupled to the MUX 850. An equalizer control on/off (Q) line 852 is electrically coupled to the MUX 860.

A high-speed external processor parallel logic interface 800 provides the lines utilized to program the transmitter depicted in FIG. 8. The high-speed external processor parallel logic interface 800 in essence transfers device-parameter programming data from the DSP or other controller to the respective appropriate hardware subsystems to perform the specific modulation function(s) desired. To overcome typical parallel-interface speed and/or pin-number limitations, some internal intermediate caching memory and perhaps decoding and/or timing logic (between the external interface and the synthesis blocks) is highly useful in helping to achieve high rates of DS chipping (spreading), frequency-hopping/chirping, and even data modulation, particularly when implementing more complex modulation formats (such as the denser QAM constellations).

Additional features of the implementations of FIGS. 7-8 include the ability to generate chirp or composite DS/chirp modulations with downstream amplitude-modulation capabilities via the front-end frequency-accumulator stage; here, a rate-of-sweep word and start-frequency can be programmed into the frequency-control circuitry. The following phase-accumulator block with its phase-to-amplitude converter (sine/cosine ROMs) and amplitude multiplier (modulator) will then output near-sinusoidal waves to the I- and Q-channel DACs in the selected IF-range frequency band. Further, the amplitude multipliers can alternatively (and preferably) be full four-quadrant multipliers, which besides reducing spectral splattering will also allow both positive and negative amplitude variations (swings), and the option of downstream binary phase-shift keying (which can be implemented via a simple amplitude inversion or sign change).

Example 6

Figure 9:
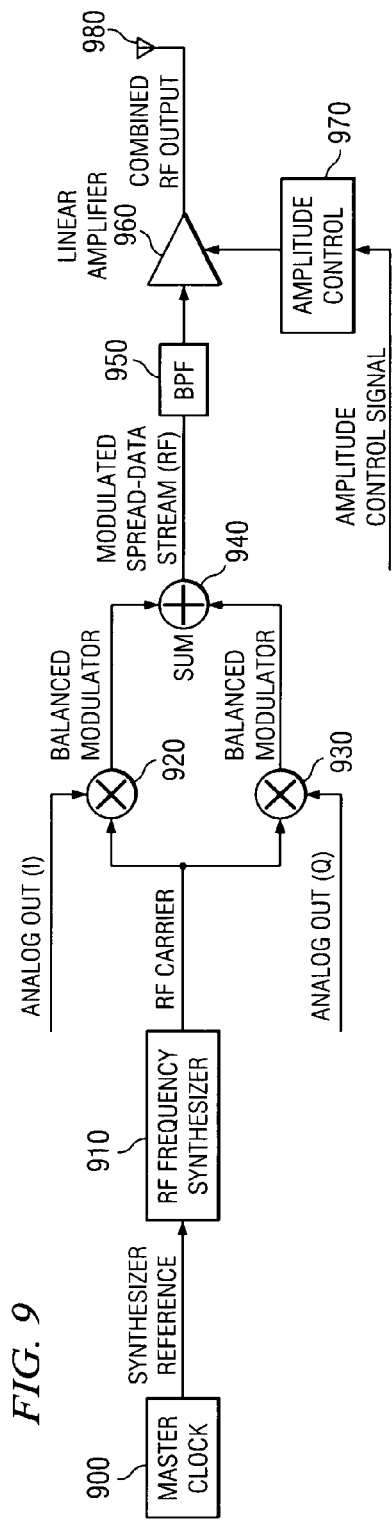
FIG. 9 illustrates a block schematic view of an RF upconverter circuit, representing an embodiment of the invention.

Referring to FIG. 9, a typical RF upconverter circuit used in digital data transmitters is depicted. The RF upconverter is utilized to convert the quadrature (I and Q) analog signal outputs (such as from systems as depicted in FIGS. 7 and 8)

into RF signals such as those employed to implement the present invention. A master clock 900 may be the same clock indicated in previous figures or else a dedicated unit, which in conjunction with an RF frequency synthesizer 910 generates the final RF carrier frequency. Two identical carrier-frequency signals feed a pair of balanced modulators 920,930. The balanced modulator 920 mixes the RF carrier-frequency signal with the "I" analog intermediate-frequency (IF) output from the DDS circuit (depicted in FIG. 7 and FIG. 8). The balanced modulator 930 mixes the RF carrier-frequency signal with the "Q" analog intermediate-frequency (IF) output from the DDS circuit (depicted in FIG. 7 and FIG. 8).

Still referring to FIG. 9, a pair of signals from the balanced modulators 920,930 is linearly added in the summing block 940 to produce the final quadrature-modulated RF spread data signal. A band-pass filter (BPF) 950 removes out-of-band energy (including RF harmonics and images) before feeding the signal into the linear RF power amplifier 960. An amplitude control signal 970 derived from the system control hardware alters the RF output power as desired, for power control, amplitude dithering/modulation, or both. The final output signal then feeds an antenna 980.

Example 7

Figure 10:
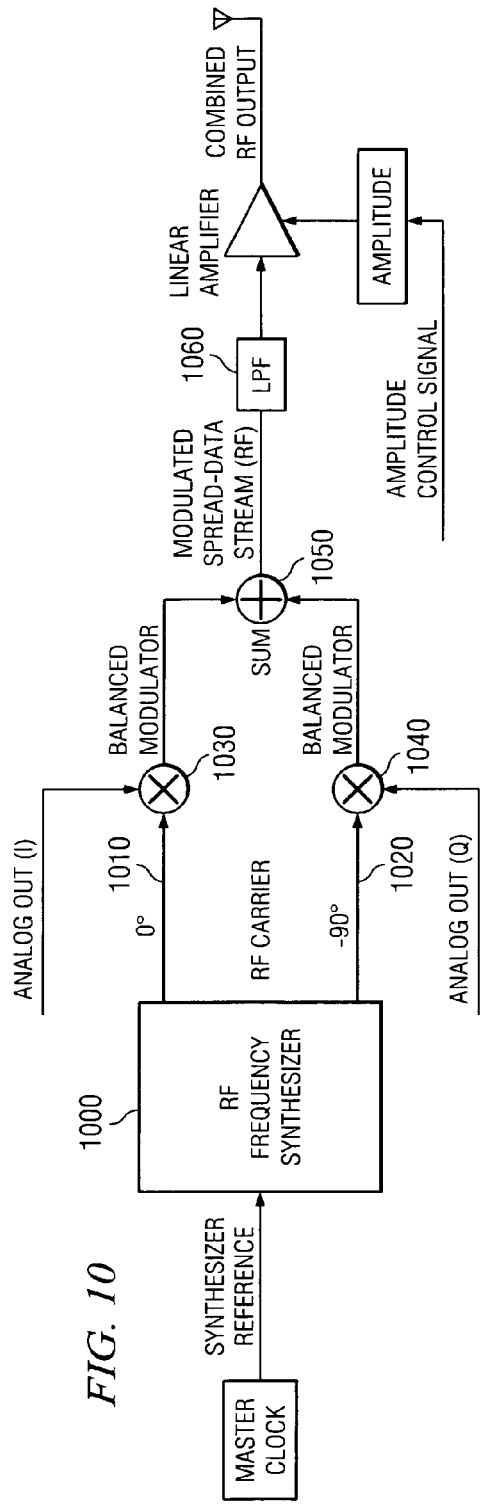
FIG. 10 illustrates a block schematic view of an alternate RF upconverter circuit, representing an embodiment of the invention.

Referring to FIG. 10, an alternate but well known "single-sideband" or "image-rejecting" RF upconverter arrangement is depicted. The RF upconverter is essentially identical to the circuitry of FIG. 9, except that the RF frequency synthesizer 1000 provides two quadrature-phased (0° and −90°) carrier signals 1010,1020 to the two balanced modulators 1030,1040, which in turn are fed by the "I" and "Q" analog IF signals from the DDS circuitry (depicted in FIG. 7 and FIG. 8), respectively. Since the image-frequency component is largely cancelled at the summer's 1050 output, a simple low-pass filter (LPF) 1060 maybe utilized in many instances to provide adequate RF spectral purity of the final transmitted signal.

Implementations of the corresponding receiver systems, despite their fine-grained complexity, can in general architecturally follow the examples of the previous figures.

Example 8

Referring to FIG. 11, a typical dual-polarization HSS transmitter implementation incorporates a master clock 1100 to generate all required timing signals from a common reference source, including the synthesizer reference signal 1101 (typically 10 MHz) and the spread-spectrum chipping clock frequency 1102, which drives the main system PN polynomial code generator 1112. The code generator outputs a serial n-bit PN code chip-stream 1114 for the DS signal to XOR gate 1115, which binary-multiplies the chip-stream 1114 by the digital data input sequence at 1116. The resulting BPSK spread-data stream at the XOR output 1117 is then fed to balanced modulator 1130 to DS spread-spectrum modulate the RF carrier-frequency signal 1111. Meanwhile, the PN generator 1112, corresponding to the internal state of its internal binary polynomial registers, also outputs a parallel m-bit word 1103 to the RF frequency-synthesizer block 1110 which in part controls the RF output frequency at 1111. The remainder of the digital frequency-control data is input from a p-bit wide bus 1104 from an external RF band-selection data source. The input words at 1103 and 1104 completely specify the instantaneous final RF carrier frequency generated by synthesizer 1110, including the desired (usually pseudorandom) frequency-hopping pattern. The hopped signal exiting at 1111 is then multiplied by the DS component at balanced-modulator 1130 to generate the composite FH/DS-format HSS signal at 1131. Unwanted harmonics and other spurious signals are removed by LPF 1132 and the signal is divided into two identical, typically equal-level components by splitter 1133. The two outputs signals from the splitter (1134, 1135) each feed a gain-controlled RF amplifier (1136, 1137) and in turn a singly polarized antenna (1140, 1141) to transmit the vertically (V) and horizontally (H) polarized signals. A separate k-bit data word 1113 is extracted from the PN generator 1112 and feeds amplitude-control circuit 1120, which in turn digitally adjusts the output level of RF amplifier 1136 according to the value of the k-bit word via signal 1123. The k-bit data 1113 is also presented to subtractor logic block 1122, which simply calculates the difference between word 1113 and a constant equal to $2^k$. This remainder value, which appears at 1121, represents the rest of the output power and is input to amplitude-control block 1121. In turn, the control signal at 1124 alters the output of RF amplifier 1137; thus, the total combined power emitted from the V and H antennas remains constant, but the relative proportions allotted to the V- and H-polarized signals will vary in a pseudorandom fashion according to the k-bit codeword 1113. This dithering of the relative transmitted signal polarization is another means of multipath mitigation and represents a further, highly useful aspect of the instant invention.

Example 9

Figure 12:
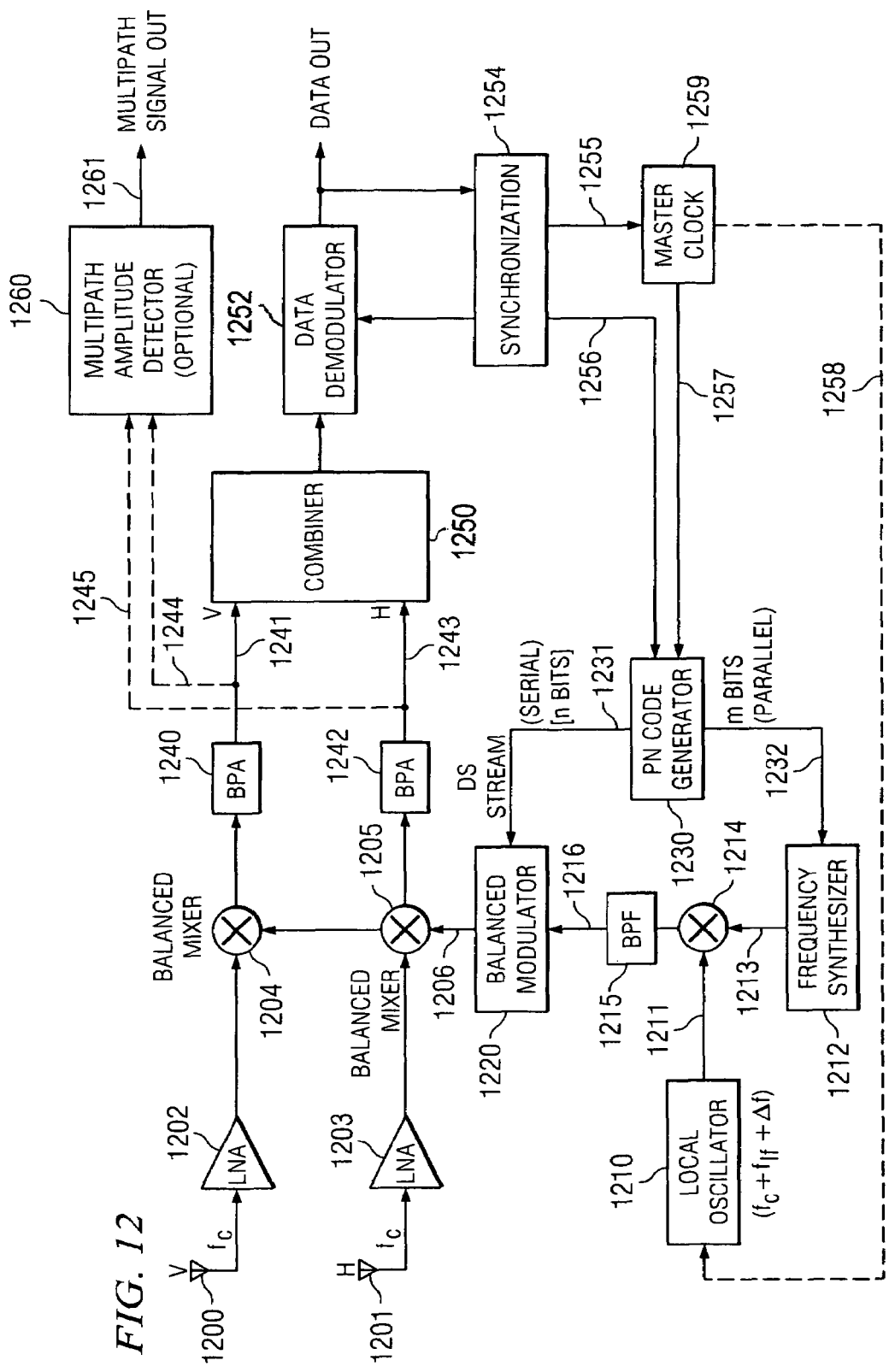
FIG. 12 provides a block diagram of an RF receiver system corresponding to the transmitter of FIG. 11, which incorporates polarization-diversity reception capability, representing an embodiment of the invention.

Referring to FIG. 12 (and following from the basic implementation of FIG. 2) a typical polarization-diversity HSS receiver according to an aspect of the invention is described. The respective V- and H-polarized HSS signals are received in antennas 1200, 1201 at left, boosted by LNAs 1202, 1203, and introduced to down-converting balanced mixers 1204, 1205. The mixers are each fed with an FH/DS-modulated local oscillator signal 1206, generated in balanced-modulator block 1220. The two diversity (V and H) input signals are down-converted to the desired intermediate frequency (IF) via the balanced mixers, amplified and bandpass filtered in bandpass amplifier (BPA) blocks 1240, 1242, combined via gating, weighted or unweighted summing, maximal-ratio combining, or other techniques in block 1250, and finally demodulated in a conventional manner in 1252 according to the type of data modulation employed (ice., BPSK, QPSK, MSK, etc.). The combiner 1250 may also employ a modified form of majority-logic directed feedback through the demodulator 1252 to optimally combine the separate input V and H signals; alternatively, the demodulator could via two separate channels independently decode the V and H data signals before developing the final optimized result. Of course, the use of diversity antennas should not considered in the invention to be constrained to two (V and H), but could easily include additional received channels of both polarizations to provide spatially diverse reception capability for improved signal reception efficiency, much as current CDMA cell-phone systems, which use multiple-finger. "rake" receivers to deal with multipath signals. Conversely, the use of the V and H signal polarizations in the HSS receiver could certainly include similar combining schemes to those of the "rake" architecture. A further option in the HSS receiver would be to utilize a combiner specifically optimized to handle the constant-envelope signals produced by one specific variety of HSS transmitter. Since incidental multipath reflections invariably cause spurious amplitude modulations (AM) in the received signals (though the transmitted signal was nomionally of constant amplitude), the detection of these amplitude variations can be explicitly employed to trigger corrector circuits which serve to minimize the incidental AM and thereby reduce the received-signal waveform distortion caused by the multipath. As in the transmitter above, m bits from the n-bit PN code generator (though typically offset by a fixed amount from those in the transmitter to provide the desired IF difference frequency) are used to select the desired hopping channels within the selected RF receiving band. This is accomplished by operating a master PN code generator 1230 essentially identical to that in the HSS transmitter of FIG. 11 and extracting an m-bit parallel data bus (corresponding to the internal registers of the PN generator) to drive the RF frequency-synthesizer block 1212 with the hopping component of the full code. The serial chipping-code stream is output at 1231; this feeds one input of the DS balanced-modulator block 1220. The synthesizer output at 1213 is mixed at 1214 with the output of a typically fixed local oscillator 1210, which operates at an offset (the IF) from the nominal RF input center frequency to up-convert the synthesizer to the desired RF band. Bandpass filter (BPF) 1215 removes the undesired image component; the filtered output at 1216 is then applied to the balanced modulator 1220 to generate the desired HSS-modulated (FH/DS) local oscillator signal at 1206.

This locally spread signal then (when properly synchronized) automatically despreads the DS portion of the incoming hybrid signal; the hopping of the local signal also removes the FH component, leaving a simple data-modulated single-frequency signal at the input to the bandpass IF amplifier chains 1240, 1242. Synchronization for the system 1254 is derived from the data stream, the RF carrier frequency, or a combination thereof. Synchronization of the Master Clock 1259, PN Generator 1230, and Local Oscillator 1210 are achieved through feedback signals 1255, 1256, and 1258 respectively. An optional multipath-amplitude detector block 1260, fed from the V and H IF outputs 1241, 1243 (via lines 1244, 1245) can provide a relative measurement of the amount of multipath-caused disturbances in the received signal. This is typically implemented via detection of variations in the received-signal's envelope (amplitude), which are utilized by separate signal-processing circuitry to estimate the multipath-induced degradations in the incoming signal and perform at least a first-order cancellation thereof to improve final data quality at the receiver's output. The final processed output of this multipath-estimation block is shown at 1261. An additional feature of the multipath detector is that dynamic estimates of received-signal quality obtained therein can be utilized not only to adaptively improve reception of the incoming data stream but also (in an HSS transceiver scenario) to trigger dynamic optimization of the outgoing HSS transmitter signal format (e.g., DS, FH, TH, and/or polarization parameters) to help counter both static and dynamic changes in thr RF channel environment.

Practical Applications of the Invention

Practical applications of the invention that have value within the technological arts include: wireless sensors and data networks in industrial plants, offices, commercial buildings, and warehouses; environmental monitoring systems; container/asset/personnel tracking and telemetry applications; wireless local-area networks (WLANs); medical telemetry, battlefield/tactical sensors; and secure data transmission for industrial, military, and national security applications, all equally valid for domestic and foreign markets. There are virtually innumerable uses for the invention, all of which need not be detailed here.

Advantages of the Invention

A hybrid spread-spectrum system, representing an embodiment of the invention, can be cost effective and advantageous for at least the following reasons. The invention improves quality and/or reduces costs compared to previous approaches. Other advantages can include: superior multipath-rejection capabilities, improved data integrity/security, better low probability-of-detection/probability-of-interception (LPD/LPI) properties, lower link delay (latency) figures, superior narrowband/wideband jamming resistance, fast synchronization, higher user density, less mutual interference among users in a given area or frequency band, increased statistical signal diversity (for better robustness), the superior near-far reception properties of FH (a major drawback of pure-DS systems), and lower overall peak occupied bandwidths (less spectral "splatter") as compared with most present spread-spectrum radio techniques. An additional key use of the HSS protocol is in the combined (or separate) reader/interrogator units to extract data from passive, semi-passive, semi-active, or fully active RF tags, commonly known as RFID tags. The use of HSS protocols in the tag reader units, which typically combine both interrogating (illuminating) RF transmitter and associated receiver-reader devices, will provide greater tag reading efficiencies than either standard DS or FH based systems, due to the greater signal diversity of the HSS emissions. Whereas virtually all existing tag readers have null or "dead" spots in their RF tag-interrogating fields, the constantly dithered HSS signal will statistically have far fewer signal nulls and will thereby exhibit a higher RF tag read efficiency, with fewer tag "no-reads".

A greater appreciation of the benefits of the hybrid spread-spectrum signaling technique of the invention can be had by examination of the typical 915-MHz indoor RF delay profile of FIG. 13. In this environment, the signal-dispersion times range from roughly 10 to 250 ns, with a median RMS dispersion value of about 46 ns. The longer values, corresponding to larger spaces or enclosed areas typical of industrial manufacturing facilities, would imply a minimum spreading rate of approximately 4 Mchips/sec, while the shorter (worst-case) values encountered in offices or smaller rooms call for spreading rates of up to about 100 Mchips/sec (and, thus, at least 100 MHz of total transmitted signal bandwidth). Obviously, this latter requirement exceeds the available bandwidth in either the 915 or the 2450-MHz ISM bands and requires the full width of any of the three 5-GHz ISM/U-NII bands allocated for unlicensed spread-spectrum transmissions in the U.S. Even in the latter case, to operate multiple full-band devices in the same space would require careful coordination of the multiple users (via time multiplexing or power-controlled code-division multiple-access [CDMA] techniques) to prevent significantly large numbers of collisions and a consequential loss of data packets.

Compared with conventional direct-sequence or frequency-hopping spread-spectrum systems, the hybrid technique of the invention offers improved process gain, jamming margin, and multiple-access capabilities. In addition, the hybrid technique offers the advantages of the relative freedom from near-far effects of FH as compared with conventional DS. Since in the hybrid system the DS component can be of lesser bandwidth for comparable overall performance, the front-end and IF bandwidths of the hybrid receiver can be significantly-smaller (and thus possess greater selectivity) than in the standard DS implementation, thereby offering greater filter-based rejection of adjacent-channel, out-of-band, and spurious signals. Thus, the much higher amplitudes of a nearby but off-channel transmitter will not cause the signal blockages of the weaker (more-distant) desired on-channel signal typical of conventional DS systems.

From Chapter 2 of the standard text *Spread Spectrum Systems with Commercial Applications, 3rd Edition*, by Robert C. Dixon, John Wiley & Sons, Inc., 1994, pp. 18-58, the classic equation for the generalized process gain of a standard spread-spectrum (direct-sequence or frequency-hopping with contiguous, non-overlapping channels) signal is:

$$G_p = BW_{RF} \div R_{info}$$

where $G_p$ is the effective processing gain, $BW_{RF}$ is the total (two-sided) spread-spectrum RF signal bandwidth, and $R_{info}$ is the modulating (pre-spreading) data rate or information bandwidth, also in the total modulated (two-sided) representation. For standard direct-sequence systems, the gain is in general equal to the spreading-code length; in the case of simple frequency-hopping systems, the (long-term average) processing gain for contiguous or non-contiguous channel ensembles is simply equal to the total number of hopping channels. If we concurrently utilize both DS and FH methods, assuming that the DS signal bandwidth is small compared to the width of the total available RF band, so that there are a reasonably large number of hybrid hopping channels, the overall hybrid-signal process gain is simply the product of the two individual process gains:

$$G_{p(FH/DS)} = G_{p(FH)} \times G_{p(DS)}$$

In decibels, the equation becomes:

$$G_{p(FH/DS)dB} = G_{p(FH)dB} + G_{p(DS)dB} = 10 \log(\text{no. of hopping channels}) + 10 \log(BW_{DS}/R_{info})$$

where $G_{p(FH/DS)}$ is the hybrid spread-spectrum process gain, $G_{p(FH)}$ is the frequency-hopping gain, and $G_{p(DS)}$ is the straight direct-sequence gain. In the theoretical limit, for a fixed available band width (e.g., 26 MHz for the 902-928 MHz ISM band) and non-overlapping FH channels, the composite process gain for the hybrid DS/FH system cannot exceed the ratio of the total bandwidth to the information rate. For instance, if one chose to send a standard data rate of 19.2 kb/s using a single DS signal occupying the entire band, then the maximum attainable in-band process gain using QPSK modulation would be $26 \times 10^6 \div 19.2 \times 10^3 \cong 1354 \cong 31.3$ dB. For full-band noise, interference, or jamming, then, hybrid DS/FH techniques using non-overlapping channel sets will not theoretically provide any more process gain than for the single DS signal but will in practice still be superior to the full-band DS format in rejecting multipath-induced errors, in resolving near-far interference effects, and in permitting multiple signals to be sent simultaneously within the confines of the selected band. [If, however, the FH channels are overlapped 50% (i.e., by half the DS chipping rate), then the DS/FH system can actually achieve about double (+3 dB) the process gain of the straight-DS version.] Further, as compared with conventional DS implementations, the hybrid SS systems will provide equivalent or better link performance with lower composite chipping rates, slower hardware processing speeds, and generally reduced transmitting-device and receiver power consumption.

Concatenating coordinated time-hopping with the DS/FH hybrid method adds several additional modes of improved operational flexibility. In the usual sense, time hopping by itself does not provide process gain, assuming the receiver input is gated off during non-transmission intervals; instead, an effective jamming gain or margin for continuous interfering signals is afforded in a manner directly proportional to the signal's duty cycle, i.e., the ratio of the transmitter (or receiver) "on" times to the total interval under consideration. Correspondingly, the effective "process gain" for intermittently interfering signals is (statistically) simply the product of the two signals' duty cycles. The principal advantage in adding coordinated or code-synchronized time-hopping is in the improved system performance with multiple devices in a shared RF environment (the "multiple-access" scenario). For example, if there are several hundred sensor devices in a common area (e.g., a factory complex, high-rise office building, shipping terminal yard, etc.) which all need to send intermittent telemetry data to a central receiver, the use of DS alone with random burst transmissions can only succeed if the product of the number of devices and their RF burst lengths is relatively small compared to unity, i.e., the system duty factor is <<100%. Otherwise, a large number of collisions will occur and much data will be lost; frequent retransmissions will improve the average system transmission reliability, but at the expense of significantly lower aggregate data rates and wasted device energy. The use of code-division multiple access (CDMA) techniques can resolve most of the collision problems but invariably adds significant complexity (and cost) to the system by adding major infrastructure components (i.e., base stations) and also forcing the addition of RF receivers, coders, and complex control hardware and algorithms to close the required RF link power-control loop at each device. The massive complexity of the CDMA approach is generally cost-effective only in the mass consumer cell-phone market due to the sheer numbers (tens of millions) of deployed units; for general low-power (battery-operated) RF telemetry applications, especially including simple, inexpensive transmit-only sensor and tag devices, the general DS/CDMA approach is neither power- nor cost-effective.

Another, more intuitive explanation of the advantages of the combined FH/TH/DS signaling method of the invention follows. Suppose that two independent sensor/telemetry devices happen to transmit their data in a common environment (e.g., a large factory) at the same time, using the FH/TH/DS technique. Assuming even that both are in the same group and have the same assigned DS spreading code, each is programmed to select a different portion of that code to drive its onboard FH and TH circuitry; thus, each will (statistically) transmit at different frequencies and at different times. Even if the two do transmit simultaneously, statistically they will be on different frequencies; if they use the same hopping frequencies, they will statistically use them at disparate times. Assuming negligible noise levels, the effective probability of a data error due to a collision between two hybrid FH/TH/DS signals can be calculated as the product of: (1) the probability of a collision in the time domain [i.e., the product of the two devices' randomized individual duty cycles]; (2) the probability of a frequency collision [approximately the product of the inverse of the lengths of the individual FH control sequences, assuming non-overlapping hopping channels]; and (3) the cross-correlation power ratio of the two codes, assuming nearly equal signal powers at the receiver, as in the case of power-controlled CDMA systems. If there are unequal powers, the third term [the DS separation ratio] will be somewhat degraded, by about 1 dB per 2.5 dB of received power deviation from the ideal (i.e., equal); thus, the effective error rate probability due to collision of the two signals will be:

$$P_e \cong P_{ec} = P_{ci} \cdot P_{cf} R_{cc}$$

where the overall bit-error probability $P_e$ in the absence of significant background random noise and multipath effects is roughly equal to $P_{ec}$, the error due to collisions alone (i.e., a variant of the classical dominant multiple-access interference in CDMA cell-phone systems); this is in turn simply the product of the respective collision rates in time and frequency, given by $P_c$, and $P_{cf}$, with the effective code-power separation ratio $R_{cc}$ (power cross-product vs. self ratio) of the selected DS code versus its companion codes (e.g., about 24 dB for an assumed order-10, 1024-length augmented Gold code). In the usual HSS application, asynchronous code sets such as MLS, Gold, and Kasami codes are preferred; the Walsh codes used in CDMA cell-phone systems require fully synchronous (coherent) reception to achieve usefully low levels of code cross-correlation and thus demand significantly greater system complexity. For example, if the overall polynomial length of each signal is $1024=2^{10}$, and the FH segment length is $64=2^6$ and the TH duty factor of both is $\frac{1}{16}$, then the approximate time-averaged probability of a single-hop collision between the two HSS transmissions is given by:

$$(\tfrac{1}{16})\cdot(\tfrac{1}{64})\cdot(\tfrac{1}{8})\cdot(\tfrac{1}{64})\cdot R_{cc}\approx(\tfrac{1}{1024})\cdot(\tfrac{1}{512})\cdot(10^{-2.4})\approx 7.58\times 10^{-9}$$

assuming good device power control. Obviously, the code separation provides adequate isolation even if both devices transmit at the same time (or partially overlapping times) and on the same frequency. [The overlapping time-slot scenario gives two opportunities for collision, thus causing a doubling of the nominal $\frac{1}{16}$ TH factor for the second device]. For multiple-hop transmissions, the expressions quickly become very complex and the mode of detection must also be included (i.e., standard, majority-logic, soft-logic, etc.); for a full-system calculation, all user parameters (bit rates, chipping rates, hopping rates, bandwidths, spreading-code correlation characteristics, device power levels, modulation/demodulation methods, etc.) must be considered as well. For the multi-user case with k distinct devices, the HSS system will exceed the usual performance-levels for standard power-controlled DS-CDMA systems, as described by the standard equation for multiple-access bit-error probability:

$$P_{e(DS)}=\tfrac{1}{2}erfc[2/(k-1)\cdot(f_b/f_c)]^{1/2},$$

where $f_b$ and $f_c$ are the bit and chip rates, respectively. The corresponding equation for the HSS case will also include terms for the FH ($P_{cf}$) and TH ($P_{ct}$) access statistics, which are highly dependent on the system's specific parameters but in general will decrease the $P_e$ figure by at least an order of magnitude (often more):

$$P_{e(HSS)}=\tfrac{1}{2}erfc[2/(k-1)\cdot(f_b/f_c)]^{1/2}\cdot P_{cf}P_{ct}$$

The jamming margin for the hybrid system is similarly complex but is still comparably greater than that of its standard DS and FH counterparts; in general, the jamming ratio is simply the spread-spectrum process gain minus implementation losses and the required signal-to-noise ratio, so the HSS case is invariably more robust to usual forms of interference or jamming.

As previously explained, the fast-hopping form of the HSS waveform (certain embodiments of which are referred to as "FastHSS") can include the specific code-related combination of standard direct-sequence (DS) spread-spectrum modulation with "fast" frequency hopping (FFH), wherein multiple frequency hops occur within a single data-bit time. Again, the most significant benefit of this waveform is that each bit is represented by chip transmissions at multiple frequencies. If one or more chips (or hops) are corrupted by multipath or interference in the RF link, a majority will statistically still be correct. More specifically, for the fast-hopping form of the HSS waveform, the improved bit-error-rate is accomplished in the receiver by comparing bit-length cross-correlation functions with sub-bit-length cross-correlations on a bit-by-bit basis and utilizing whichever value is optimum (e.g., has a higher correlation value). For example, if an HSS signal has a spreading length of N chips/bit and H hops/bit, then there are (N÷H) chips/hop. So, if one of the hops experiences interference due to multipath or jamming, then the other N−(N÷H) chips are still available for establishing the value of that bit. In fact, if each group of $x_n$=(N÷H) chips, where [n=1, 2 . . . H] can be declared valid versus invalid, and only the valid groups used for cross-correlation, then the receiver's ability to correctly decode that particular bit is greatly enhanced. Typically, DSSS receivers make a chip-by-chip determination of the phase of a carrier (assuming PSK modulation) or they use multi-level logic (accumulation of the correlation sums) and perform a pseudo-bit-length integration. By utilizing FastHSS, the receiver can dynamically (bit-by-bit) optimize this trade-off, whereas existing-art DSSS systems or FH/DS systems that hop slower than once per bit cannot utilize this advantage.

Therefore, during tracking, each group of $x_n$ chips are cross-correlated with the corresponding portion of the stored PN code. In parallel, the receiver logic performs a standard bit-length auto-correlation of the fall chipping sequence. If the standard auto-correlation function surpasses the detection threshold sufficiently to recognize a valid data-bit result, then the subset cross-correlation functions are ignored. However, if the bit-length autocorrelation value is insufficient for unambiguous data-bit detection, then the H subset cross-correlation values are evaluated. If the threshold for bit-length correlation is assumed to be a·N, then the subset cross-correlation thresholds would be set to a·(N÷H). If i of the subset cross-correlation values are deemed sufficiently unambiguous then we concatenate those subsets and use a threshold of i·a·(N÷H), where i<H.

Analytically, we let $S_1=\cos[(\omega_1+h\omega_A)t]\cdot m_1(t)d_1'(t)$ represent the received signal, where $d_1'(t)$ represents the source-encoded data, $m_1(t)$ represents the spreading code and $\cos[(\omega_1+h\omega_A)t]$ is the hopped carrier signal. Let the stored received waveform be represented as $S_2=S_1+I+N_0$, where I represents interference sources and $N_0$ represents additive white Gaussian noise (AWGN). Thus, the autocorrelation function for the entire bit is:

$$R(\tau) = \left(\frac{1}{T_0}\right)\int_{T_0} S_1(t)S_2(t+\tau)\,dt$$

where $T_0$ is the bit-period and $S_i(t)$ are periodic, and the autocorrelation function utilizing subsets is:

$$R_{subsets}(\tau) = \sum_{i=1}^{H}\left(\frac{1}{T_0/H}\right)\int_{t_0+(i-1)*T_0/H}^{t_0+i*T_0/H} S_1(t)S_2(t+\tau)\,dt$$

In the case where there is no noise or interference, $R(\tau) = R_{subsets}(\tau)$, and they both sufficiently surpass an unambiguous threshold. However, in cases where at least one of the H frequencies experiences interference, either or both of these equations may not meet the requirements for unambiguous bit detection. In this case, individual subset cross-correlation functions are evaluated to determine which ones meet the criteria:

$$R_i(\tau) = \left(\frac{1}{T_0/H}\right) \int_{t_0+(i-1)*T_0/H}^{t_0+i*T_0/H} S_1(t)S_2(t+\tau)dt \geq a \cdot N/H$$

If any one of the $R_i(\tau)$ meet this criteria and all ambiguous $R_i(\tau)$ are removed, then the bit can be unambiguously detected by calculating:

$$R_{subsets}(\tau) = \sum_{i=1}^{H} \left(\frac{1}{T_0/H}\right) \int_{t_0+(i-1)*T_0/H}^{t_0+i*T_0/H} S_1(t)S_2(t+\tau)dt -$$

$$\sum_{j=1}^{k} \left(\frac{1}{T_0/H}\right) \int_{t_0+(j-1)*T_0/H}^{t_0+j*T_0/H} S_1(t)S_2(t+\tau)dt$$

where there are k ambiguous subsets and $j=b_i$ designate the individual ambiguous subsets.

A simpler, more probabilistic approach to a more optimal detection of FastHSS chips involves the use of majority logic, in which for the H hops per bit, only slightly more than half need be correct. For H odd (i.e., $H=2^n-1$), the minimum number of correct hops (or chip groups) is $2^{n-1}$; for H even (e.g., $H=2^n$), the required minimum number is $2^{n-1}+1$. If we designate the number of total hops (chip groups) representing a single bit as H, then the total FastHss bit-error probability for hard binary-decision detection-can be expressed as:

$$P_e = \sum_{x=r}^{H} (^H_x C) p^x (1-p)^{H-x}$$

where $P_e$ is the total bit-error probability, H is the total number of hops or chip-groups per bit, r is the minimum number of correct values per bit (for the majority-logic decision), C is the symbol for the probabilistic combination (of H things taken x at a time), p is the sample (hop) error probability, and x is the index of summation. For instance, if we employ three hops for a data bit, then two sample (hop) decisions must be correct to avoid an error. Thus, for a basic $p=10^{-2}$, $p_e$ is $2.98\times10^{-4}$; similarly, for $p=10^{-3}$, $P_e=2.998\times10^{-6}$. If we instead use 3 out of 5 hops for the decision, for a p of $10^{-3}$ we get $P_e \approx 9.8\times10^{-4}$ and for $p=10^{-3}$, $P_e$ becomes about $9.8\times10^{-7}$. Clearly, the use of multiple hops and majority decision logic can yield significant performance improvements over existing-art bit-detection approaches. Even greater advantage (>2 dB) can be gained in this instance by the use of soft-decision (multilevel) techniques, well known in maximum-likelihood bit-detection schemes such as Viterbi decoders.

The terms a or an, as used herein, are defined as one or more than one. The term plurality, as used herein, is defined as two or more than two. The term another, as used herein, is defined as at least a second or more. The terms "comprising" (comprises, comprised), "including" (includes, included) and/or "having" (has, had), as used herein, are defined as open language (i.e., requiring what is thereafter recited, but open for the inclusion of unspecified procedure(s), structure(s) and/or ingredient(s) even in major amounts. The terms "consisting" (consists, consisted) and/or "composing" (composes, composed), as used herein, close the recited method, apparatus or composition to the inclusion of procedures, structure(s) and/or ingredient(s) other than those recited except for ancillaries, adjuncts and/or impurities ordinarily associated therewith. The recital of the term "essentially" along with the terms "consisting" or "composing" renders the recited method, apparatus and/or composition open only for the inclusion of unspecified procedure(s), structure(s) and/or ingredient(s) which do not materially affect the basic novel characteristics of the composition. The term coupled, as used herein, is defined as connected, although not necessarily directly, and not necessarily mechanically. The term any, as used herein, is defined as all applicable members of a set or at least a subset of all applicable members of the set. The term approximately, as used herein, is defined as at least close to a given-value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library arid/or other sequence of instructions designed for execution on a computer or computer system.

All the disclosed embodiments of the invention disclosed herein can be made and used without undue experimentation in light of the disclosure. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

Further, the individual components need not be combined in the disclosed configurations, but could be combined in virtually any configuration. Further, variation may be made in the steps or in the sequence of steps composing methods described herein.

Further, although the hybrid programmable DDS transmitter system described herein can be a separate module, it will be manifest that the hybrid programmable DDS transmitter system may be integrated into the system with which it is (they are) associated. Furthermore, all the disclosed elements and features of-each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A transmitter for generating a hybrid spread-spectrum signal to transmit data bits, wherein each of the data bits has a data bit time, the transmitter comprising:
a pseudo-random code generator configured to generate a first stream of pseudo-random code words and a second stream of pseudo-random code words, wherein the second stream of pseudo-random code words is generated as a function of the first stream of pseudo-random code words to interrelate the second stream of pseudo-random code words to the first stream of pseudo-random code words based upon a predetermined relationship;
a direct sequence generation circuit configured to receive the data bits to be transmitted and the first stream of pseudo-random code words, the direct sequence generation circuit configured to generate a direct sequence spread spectrum signal including a plurality of sub-sequences of chips for each of the data bits based upon the first stream of pseudo-random code words;
a programmable direct digital frequency synthesizer coupled to the pseudo-random code generator to receive the second stream of pseudo-random code words, the programmable direct digital frequency synthesizer configured to generate a carrier signal at a sequence of carrier frequencies for each of the data bits based upon a sequence of the pseudo-random code words of the second stream of pseudo-random code words received by the programmable direct digital frequency synthesizer during each data bit time; and
a modulator in communication with the direct sequence generation circuit and the programmable direct digital frequency synthesizer, the modulator configured to modulate the carrier signal with the direct sequence spread spectrum signal to generate a direct sequence fast frequency hopped spread spectrum signal.

2. The transmitter of claim 1, wherein the sequence of carrier frequencies generated by the programmable direct digital frequency synthesizer includes a first carrier frequency and a second carrier frequency;
wherein the direct sequence fast frequency hopped spread spectrum signal for each of the data bits includes at least a first sub-sequence of chips and a second subsequence of chips, and
wherein the carrier signal at the first carrier frequency is modulated by the first sub-sequence of chips and the carrier signal at the second carrier frequency is modulated with the second sub-sequence of chips.

3. The transmitter of claim 1, wherein the first stream of the pseudo-random code words includes "n" bits per data bit time;
wherein the second stream of pseudo-random code words includes "m" bit frequency-hopping control words to produce "H" frequency hops per data bit time; and
wherein n>m×H.

4. The transmitter of claim 3, wherein each of the sub-sets of chips includes the same number of chips per frequency hop.

5. The transmitter of claim 1, wherein the direct sequence fast frequency hopped spread spectrum signal corresponds to a respective data bit and includes a sub-sequence of chips for each frequency of the carrier signal used to transmit the respective data bit.

6. The transmitter of claim 1, wherein the predetermined relationship that interrelates the first stream of pseudo-random code words and the second stream of pseudo-random code words is a first predetermined relationship;
wherein the pseudo-random code generator is further configured to generate a third stream of pseudo-random code words; and
wherein the third stream of pseudo-random code words is generated as a function of a third predetermined relationship and at least one of the first stream of pseudo-random code words, the second stream of pseudo-random code words, or a combination thereof, and wherein the stream of third pseudo-random code words is interrelated by a second predetermined relationship to the at least one of the first stream of pseudo-random code words, the second stream of pseudo-random code words, and the combination thereof.

7. The transmitter of claim 6, further comprising:
an amplification circuit in communication with the modulator, the amplification circuit configured to amplify the direct sequence fast frequency hopped spread spectrum signal to generate an amplitude controlled direct sequence fast frequency hopped spread spectrum signal based upon an amplification control signal.

8. The transmitter of claim 7, further comprising
an amplitude control circuit in communication with the pseudo-random code generator and the amplification circuit, the amplitude control circuit configured to dither the amplification control signal based upon the third stream of pseudo-random code words.

9. The transmitter of claim 6, wherein each of the first predetermined relationship and the second predetermined relationship include an interrelationship based upon at least one of direct subsets of bits of the pseudo-random code generator, rolling code segments of the pseudo-random code generator, scrambling of code vectors of the pseudo-random code generator, and table-based reassignments of bit-pattern relationships of the pseudo-random code generator, or a combination thereof.

10. The transmitter of claim 6, wherein the pseudo-random code generator is further configured to generate a pseudo-random coincidence gate control signal as a function of at least one of the first stream of pseudo-random code words, the second stream of pseudo-random code words, the third stream of pseudo-random code words by the third predetermined relationship, and a combination thereof, the transmitter further comprising:
a coincidence gate coupled between the modulator and the amplification circuit, the coincidence gate configured to receive the pseudo-random coincidence gate control signal from the pseudo-random code generator; and
the coincidence gate further configured to time gate the direct sequence fast frequency hopped spread spectrum signal based upon the pseudo-random coincident gate control signal.

11. The transmitter of claim 6, wherein each of the first predetermined relationship, the second predetermined relationship, and the third predetermined relationship include an interrelationship based upon at least one of direct subsets, rolling code segments, scrambling of code vectors and table-based reassignments of bit-pattern relationships, or a combination thereof.

12. The transmitter of claim 1, wherein the pseudo-random code generator is further configured to generate a pseudo-random coincidence gate control signal;
the transmitter further comprising:

a coincidence gate in communication with the modulator and the pseudo-random code generator, the coincidence gate configured to receive the direct sequence fast frequency hopped spread spectrum signal and the pseudo-random coincidence gate control signal from the pseudo-random code generator; and wherein the coincidence gate is configured to time gate the direct sequence fast frequency hopped spread spectrum signal based upon the coincident gate control signal to generate a time hopped direct sequence fast frequency hopped spread spectrum signal.

13. The transmitter of claim 12, wherein the predetermined relationship that interrelates the first stream of pseudo-random code words and the second stream of pseudo-random code words is a first predetermined relationship; and wherein the pseudo-random coincidence gate control signal is generated as a function of at least one of the first stream of pseudo-random code words, the second stream of pseudo-random code words, and a combination thereof based upon a fourth predetermined relationship.

14. The transmitter of claim 13, wherein the fourth predetermined relationship includes an interrelationship based upon at least one of direct subsets of bits of the pseudo-random code generator, rolling code segments of the pseudo-random code generator, scrambling of code vectors of the pseudo-random code generator, and table-based reassignments of bit-pattern relationships of the pseudo-random code generator, or a combination thereof.

15. The transmitter of claim 1, wherein the modulator is a balanced modulator.

16. The transmitter of claim 1, wherein the programmable direct digital frequency synthesizer is further configured to receive a band select input signal; and wherein the programmable direct digital frequency synthesizer is further configured to generate the carrier signal within a frequency band as a function of the second stream of pseudo-random code words and the band select input signal.

17. A transmitter for generating an electromagnetically polarized hybrid spread spectrum signal to transmit data bits, the transmitter comprising:

a pseudo-random code generator configured to generate a first stream of pseudo-random code words and a second stream of pseudo-random code words, wherein the second stream of pseudo-random code words is generated as a function of the first stream of pseudo-random code words to interrelate the first stream of pseudo-randsom code words to the second stream of pseudo random code words based upon a predetermined relationship;

a programmable direct digital frequency synthesizer coupled to the pseudo random code generator to receive the second stream of pseudo-random code words, the programmable direct digital frequency synthesizer configured to directly generate a carrier signal having a carrier frequency based upon the second stream of pseudo-random code words, and wherein in response to the second stream of pseudo-random code words, the programmable direct digital frequency synthesizer is further configured to hop the carrier frequency of the carrier signal during a data bit time for each of the data bits, wherein multiple carrier frequency hops occur within each data bit time;

a balanced modulator in communication with the programmable frequency direct digital synthesizer, the modulator configured to receive a direct sequence spread spectrum signal generated with the second stream of pseudo-random code words, and the balanced modulator further configured to generate a fast frequency hopped direct sequence spread spectrum signal as a function of the carrier signal having multiple carrier frequency hops during each data bit time as a function of the first stream of pseudo-random code words;

a first antenna having a first polarization, the first antenna in communication with the balanced modulator, the first antenna configured to emit the fast frequency hopped direct sequence spread spectrum signal as a first fast frequency hopped direct sequence spread spectrum signal with the first polarization; and a second antenna having a second polarization, the second antenna in communication with the balanced modulator, the second antenna configured to emit the fast frequency hopped direct sequence spread spectrum signal as a second fast frequency hopped direct sequence spread spectrum signal with the second polarization.

18. The transmitter of claim 17, wherein the predetermined relationship includes an interrelationship based upon at least one of direct subsets of bits of the pseudo-random code generator, rolling code segments of the pseudo-random code generator, scrambling of code vectors of the pseudo-random code generator, and table-based reassignments of bit-pattern relationships of the pseudo-random code generator, or a combination thereof.

19. The transmitter of claim 17, further comprising:

a splitter coupled between the balanced modulator and the first antenna, and the splitter also coupled between the balanced modulator and the second antenna, wherein the splitter is configured to split the fast frequency hopped direct sequence spread spectrum signal into a first signal and a second signal; and wherein the first signal is emitted by the first antenna as the first fast frequency hopped direct sequence spread spectrum signal and the second signal is emitted by the second antenna as the second fast frequency hopped direct sequence spread spectrum signal.

20. The transmitter of claim 17, further comprising:

a first RF amplifier coupled between the balanced modulator and the first antenna, the first RF amplifier configured to amplify the first fast frequency hopped direct sequence spread spectrum signal with a first amplification level; and a second RF amplifier coupled between the balanced modulator and the second antenna, the second RF amplifier configured to amplify the second fast frequency hopped direct sequence spread spectrum signal with a second amplification level.

21. The transmitter of claim 20, further comprising:

the pseudo-random code generator further configured to generate a third stream of pseudo-random code words; and an amplitude controller coupled to the pseudo-random code generator, the amplifier controller in communication with the first RF amplifier and the second RF amplifier, wherein the amplifier controller is configured to dither the first amplification level and the second amplification level as a function of the third stream of pseudo-random code words.

22. The transmitter of claim 21, wherein the predetermined relationship that interrelates the first stream of pseudo-random code words and the second stream of pseudo-random code words is a first predetermined relationship; and wherein the third stream of pseudo-random code words is generated as a function of at least one of the first stream of pseudo-random code words, the second stream of pseudo-random code words, and a combination thereof based upon a second predetermined relationship.

23. The transmitter of claim 22, wherein each of the first predetermined relationship and the second predetermined relationship includes an interrelationship based upon at least one of direct subsets of bits of the pseudo-random code generator, rolling code segments of the pseudo-random code generator, scrambling of code vectors of the pseudo-random code generator, and table-based reassignments of bit-pattern relationships of the pseudo-random code generator, or a combination thereof.

24. The transmitter of claim 17, wherein the first amplification level and the second amplification level are dithered at a rate greater than a reflection coefficient of a multipath condition.

25. The transmitter of claim 17, further comprising:
a first RF amplifier coupled between the balanced modulator and the first antenna, the first RF amplifier configured to amplify the first fast frequency hopped direct sequence spread spectrum signal with a first amplification level;
a second RF amplifier coupled between the balanced modulator and the second antenna, the second RF amplifier configured to amplify the second fast frequency hopped direct sequence spread spectrum signal with a second amplification level; and
an amplitude controller coupled to the pseudo-random code generator, the amplitude controller in communication with the first RF amplifier and the second RF amplifier, wherein the amplitude controller is configured to adjust the first amplification level relative to the second amplification level to maintain a relative power ratio between the first fast frequency hopped direct sequence spread spectrum signal and the second fast frequency hopped direct sequence spread spectrum signal.

26. The transmitter of claim 17, wherein the direct sequence fast frequency hopped spread spectrum signal for each of the data bits includes at least a first sub-sequence of chips and a second subsequence of chips;
wherein the sequence of carrier frequencies includes a first carrier frequency and a second carrier frequency; and
wherein the carrier signal at the first carrier frequency is modulated by the first sub-sequence of chips and, subsequently, the carrier signal at the second carrier frequency is modulated by the second sub-sequence of chips.

27. The transmitter of claim 17, wherein
the first stream of pseudo-random code words generated with the pseudo-random code generator includes a "n" bit pseudo-random codeword per data bit time; and
wherein the second stream of pseudo-random code words generated with the pseudo-random code generator includes a plurality of "m" bit frequency-hopping control words to produce "H" frequency hops per data bit time; and
wherein n>m×H.

28. The transmitter of claim 27, wherein each of the subsets of chips includes the same number of chips per frequency hop.

29. The transmitter of claim 17, wherein the first polarization and the second polarization are linearly polarized.

30. A transmitter capable of generating a fast frequency hybrid spread-spectrum signal to transmit a plurality of data bits, each of the data bits having a data bit time, the transmitter comprising:
a pseudo-random code generator configured to generate a first stream of pseudo-random code words, a second stream of pseudo-random code words, and a third stream of pseudo-random code words, wherein pseudo-random code words included in the second stream of pseudo-random code words and the pseudo-random code words included in the third stream of pseudo-random code words are a function of the pseudo-random code words included in the first steam of pseudo-random code words based upon a predetermined relationship;
a direct sequence generation module in communication with the pseudo-random code generator, the direct sequence generation module configured to receive the data bits to be transmitted and the first stream of pseudo-random code words, the direct sequence generation module further configured to generate a plurality of chips as a plurality of sub-sequences of chips for each of the received data bits based upon the first stream of pseudo-random code words;
a programmable direct digital frequency synthesizer in communication with the pseudo-random code generator to receive the second stream of pseudo-random code words, the programmable direct digital frequency synthesizer configured to generate a carrier signal based upon the second stream of pseudo-random code words;
wherein in response to the second stream of pseudo-random code words, the programmable direct digital frequency synthesizer is further configured to hop the carrier signal during each data bit time of each of the respective data bits, wherein multiple carrier frequency hops occur within each data bit time to generate a plurality of pseudo-random carrier frequencies as a sequence of carrier frequencies;
a balanced modulator in communication with the direct sequence generation circuit and the direct programmable frequency synthesizer, the balanced modulator configured to modulate the carrier signal with chips, wherein for each of the pseudo-random carrier frequencies, the carrier signal is modulated by a respective sub-sequence of the chips of the plurality of sub-sequences of chips, to generate a fast frequency hopped direct sequence spread spectrum signal; and
a coincidence gate coupled to the pseudo-random code generator and the balanced modulator, the coincidence gate configured to gate the fast frequency hopped direct sequence spread spectrum signal as a function of the third stream of pseudo-random code words to generate a time hopped fast frequency hopped direct spread spectrum signal.

31. The transmitter of claim 30, wherein the pseudo-random code generator is further configured to generate a fourth stream of pseudo random code words as a function of at least one of the pseudo random codes words of the first stream, the second stream, the third stream, and a combination thereof based upon a known relationship, the transmitter further comprising:
an amplifier in communication with the coincident gate and configured to receive the time hopped fast frequency hopped direct sequence spread spectrum signal, wherein the amplifier is further configured to amplify the time hopped fast frequency hopped direct sequence spread spectrum signal based upon an amplification control signal; and
an amplitude controller including an amplitude control input coupled to the pseudo-random code generator to receive the fourth stream of pseudo random code words, and the amplitude controller further including the amplification control signal in communication with the amplifier, wherein the amplitude controller is further configured to dither the amplification of the time hopped fast frequency hopped direct sequence spread spectrum signal based upon in response to the fourth stream of pseudo random code words.

32. The transmitter of claim 30, wherein the first stream of pseudo-random code words, the second stream of pseudo-random code words, and the third stream of pseudo-random code words are interrelated by a polynomial function which is also known at a receiver of the time hopped fast frequency hopped direct spread spectrum signal.

33. A method for generating a hybrid spread spectrum signal to transmit a plurality of data bits, wherein each of the data bits has a data bit time, the method comprising:
generating a first stream of pseudo-random code words with a pseudo-random number generator;
generating, with the pseudo-random number generator, a second stream of pseudo-random code words as a function of the first set of pseudo-random code words based upon a predetermined relationship wherein there are "H" pseudo-random code words per data bit time;
generating a spread spectrum signal that includes a plurality of sub-sets of chips, each of the sub-sets of chips including at least three chips, for each of the data bits to be transmitted based upon the first stream of pseudo-random code words;
generating, with a programmable direct digital frequency synthesizer, a sequence of "H" carrier signals per data bit time, each of the carrier signals having a pseudo-random carrier frequency, based upon the second stream of pseudo-random code words; and
modulating each of the carrier signals with a respective sub-set of chips from among the plurality of sub-sets of chips to generate a fast frequency hopped spread spectrum signal.

34. The method of claim 33, wherein generating the first stream of pseudo-random code words with the pseudo-random number generator further comprises:
generating a "n" bit pseudo-random codeword per data bit time; and
wherein generating the second stream of pseudo-random code words as a function of the first set of pseudo-random code words based upon the predetermined relationship further includes:
generating "m" kit frequency-hopping control words to produce "H" frequency hops per data bit time; and
wherein n>m×H.

35. The method of claim 33, wherein each of the sub-sets of chips includes the same number of chips per frequency hop.

36. The method of claim 33, further comprising:
generating a third stream of pseudo-random code words; and
dithering an amplitude of the fast frequency hopped spread spectrum signal as a function of the third stream of pseudo-random code words.

37. The method of claim 36, wherein the predetermined relationship used to generate the second stream of pseudo-random code words as a function of the first pseudo-random number generator is a first predetermined relationship; and
wherein the third stream of pseudo-random code words is a function of at least one of the first stream of pseudo-random code words, the second stream of pseudo-random code words, and a combination thereof based upon a second predetermined relationship.

38. The method of claim 36, wherein each of the first predetermined relationship and the second predetermined relationship are interrelated by at least one of direct subsets of bits of the pseudo-random code generator, rolling code segments of the pseudo-random code generator, scrambling of code vectors of the pseudo-random code generator, and table-based reassignments of bit-pattern relationship of the pseudo-random code generator, or a combination thereof.

39. The method of claim 36, further comprising:
generating a fourth stream of pseudo-random code words; and
time gating the dithered fast frequency hopped spread spectrum signal as a function of the fourth stream of pseudo-random code words to generate a hybrid spread spectrum signal.

40. The method of claim 36, wherein generating the fourth stream of pseudo-random code words comprises:
generating the fourth stream of pseudo-random code words as a function of at least one of the first stream of pseudo-random code words, the second-pseudo-random code words, and a combination thereof based upon the predetermined relationship.

41. The method of claim 40, wherein generating the third stream of pseudo-random code words comprises:
generating the third stream of pseudo-random code-words as a function of at least one of the first stream of pseudo random code words, the second stream of pseudo-random code words, the fourth stream of pseudo-random code-words, and a combination thereof based upon the predetermined relationship.

42. The method of claim 36, wherein the spread spectrum signal is a direct sequence spread spectrum signal.

43. The method of claim 33, further comprising:
generating an additional stream of pseudo-random code words; and
time gating the fast frequency hopped spread spectrum signal as a function of the additional stream of pseudo-random code words to generate a hybrid spread spectrum signal.

44. The method of claim 33, wherein the additional stream of pseudo-random code words is generated as a function of at least one of the first stream of pseudo-random code words, the second stream of pseudo-random code words, and a combination thereof based upon a predetermined functional relationship.

45. The method of claim 33, wherein the first stream and the second stream of pseudo-random code words are functionally interrelated by one or more relationships based upon at least one of direct subsets of bits of the pseudo-random code generator, rolling code segments of the pseudo-random code generator, scrambling of code vectors of the pseudo-random code generator, and table-based reassignments of bit-pattern relationships of the pseudo-random code generator, or a combination thereof.

46. The method of claim 45, wherein the spread spectrum signal is a direct sequence spread spectrum signal.

47. The method of claim 33, further comprising:
generating a pseudo-random dither control signal;
splitting the fast frequency hopped spread spectrum signal into a first component and a second component, wherein the first component and the second component have substantially identical signal power; and
dithering an amplitude of at least one of the first component and the second component to control a polarization between the first component and the second component based upon the pseudo-random dither control signal.

48. The method of claim 47, wherein dithering the amplitude of at least one of the first component and the second component to control the polarization between the first component and the second component further comprises:

controlling a power level of the first component and a power level of the second component to optimize signal diversity between the first component and the second component.

49. The method of claim 33, further comprising:
transmitting the fast frequency hopped spread spectrum signal from a radio frequency tag.

50. The method of claim 33, wherein the spread spectrum signal is a direct sequence spread spectrum signal.

51. A method for transmitting data bits in a high multipath environment with a hybrid spread spectrum signal, the method comprising:
generating a stream of pseudo-random codes comprising a plurality of bits;
generating within a data bit time, with a programmable direct digital frequency synthesizer, a plurality of carrier signals, each of the carrier signals having a respective pseudo-random carrier frequency as a function of a first subset of bits of the stream of pseudo-random codes; and
modulating each of the carrier signals generated during the data bit time, as a function of a second subset of bits of the stream of pseudo-random codes, with a plurality of sub-segments of chips;
generating a direct sequence fast frequency hopped spread spectrum signal, wherein each of the sub-segments of chips modulates one of the plurality of carrier signal; and
wherein the second sub-set of bits is a function of the first sub-set of bits of the bits of the stream of pseudo-random codes.

52. The method of claim 51, further comprising:
splitting the direct sequence fast frequency hopped spread spectrum signal into a first direct sequence fast frequency hopped spread spectrum signal and a second direct sequence fast frequency hopped spread spectrum signal;
linearly polarizing the first direct sequence fast frequency hopped spread spectrum signal and the second direct sequence fast frequency hopped spread spectrum signal;
transmitting the first direct sequence fast frequency hopped spread spectrum signal with a first antenna having a first polarization; and
transmitting the second direct sequence fast frequency hopped spread spectrum signal with a second antenna having a second polarization.

53. The method of claim 51, wherein the functional relationship between
the first subset of bits and the second subset of bits is based upon a predetermined relationship to be used at a receiver configured to receive the direct sequence fast frequency hopped spread spectrum.

54. The method of claim 53, further comprising:
splitting the direct sequence fast frequency hopped spread spectrum signal into a first direct sequence fast frequency hopped spread spectrum signal and a second direct sequence fast frequency hopped spread spectrum signal;
linearly polarizing the first direct sequence fast frequency hopped spread spectrum signal and the second direct sequence fast frequency hopped spread spectrum signal;
transmitting the first direct sequence fast frequency hopped spread spectrum signal with a first antenna having a first polarization; and
transmitting the second direct sequence fast frequency hopped spread spectrum signal with a second antenna having a second polarization.

55. The method of claim 54, wherein transmitting the first direct sequence fast frequency hopped spread spectrum signal with the first antenna and transmitting the second direct sequence fast frequency hopped spread spectrum signal with the second antenna further comprises:
dithering an amplitude of at least one of the first direct sequence fast frequency hopped spread spectrum signal and the second direct sequence fast frequency hopped spread spectrum signal.

56. A method of claim 54, wherein transmitting the first direct sequence fast frequency hopped spread spectrum signal with the first antenna and transmitting the second direct sequence fast frequency hopped spread spectrum signal with the second antenna further comprises:
generating a first amplitude control signal and a second amplitude control signal based upon the stream of pseudo-random codes;
modulating an amplitude of the first direct sequence fast frequency hopped spread spectrum signal based upon the first amplitude control signal; and
modulating an amplitude of the second direct sequence fast frequency hopped spread spectrum signal based upon the second amplitude control signal.

57. The method of claim 56, wherein the transmitted first direct sequence fast frequency hopped spread spectrum signal and the transmitted second direct sequence fast frequency hopped spread spectrum signal have a combined power level, the method further comprising:
controlling the first amplitude control signal relative to the second amplitude control signal to maintain a desired emitted power level envelope of the combined power level.

58. The method of claim 56, wherein modulating the amplitude of the first direct sequence fast frequency hopped spread spectrum signal based upon the first amplitude control signal and modulating the amplitude of the second direct sequence fast frequency hopped spread spectrum signal based upon the second amplitude control signal further comprises:
dithering the amplitude of the first direct sequence fast frequency hopped spread spectrum signal and the amplitude of the second direct sequence fast frequency hopped spread spectrum signal at a rate at least equal to an estimated rate of successively received reflected signals.

59. The method of claim 51, further comprising:
generating a coincident gate control signal based upon a third subset of the bits of the stream of pseudo-random codes;
gating transmission of the first direct sequence fast frequency hopped spread spectrum signal and the second direct sequence fast frequency hopped spread spectrum signal based upon the coincident gate control signal to time hop the transmitted first direct sequence fast frequency hopped spread spectrum signal and the transmitted second direct sequence fast frequency hopped spread spectrum, and
wherein the third subset of bits is a function of at least one of the first subsets of bits, the second subset of bits, and a combination thereof.

60. The method of claim 59, further comprising:
interrelating the first subset of bits of the pseudo-random codes, the second subset of bits of the pseudo-random codes, and the third subset of bits of the pseudo-random codes based upon a known relationship at the receiver.

61. The method of claim 59, wherein at least two of the first subset of bits, the second subset of bits and the third subset of bits are programmably related by one or more relationships based upon at least one of direct subsets of bits of the pseudo-random code generator, rolling code segments of the pseudo-random code generator, scrambling of code vectors of the pseudo-random code generator, and table-based reassignments of bit-pattern relationships of the pseudo-random codes of the pseudo-random code generator, or a combination thereof.

62. A method for transmitting data in a high-multipath environment, the method comprising:

generating a first stream of pseudo-random codes having a first sequence length based upon predetermined interrelationships between the first stream of pseudo random codes, a second stream of pseudo-random codes and a third stream of pseudo random codes;

generating the second stream of pseudo-random codes having a second sequence of codes, as a function of the first stream of pseudo-random codes length that is longer than the first sequence length based upon the predetermined interrelationships;

generating a third stream of pseudo-random codes as a function of at least one of the first stream of pseudo-random codes, the second stream of pseudo-random codes or a combination thereof, based upon the predetermined interrelationships;

generating multiple carrier frequencies within the data bit time with a programmable direct digital frequency synthesizer based upon the second stream of pseudo-random codes to produce a fast frequency hopped carrier signal having "H" frequency hops per each data bit time;

generating a direct sequence spread spectrum signal representative of the data based upon the first stream of pseudo-random codes, wherein the direct sequence spread spectrum signal includes "n" chips, and wherein "n" is evenly divisible by "H";

modulating the fast frequency hopped carrier signal with the direct sequence spread spectrum signal to form a fast frequency hopped direct sequence spread spectrum signal; and gating the fast frequency hopped direct sequence spread spectrum signal based upon the third stream of pseudo random codes to generate a hybrid spread spectrum signal.

63. The method of claim 62, wherein generating multiple carrier frequencies within the data bit time with the programmable direct digital frequency synthesizer based upon the second stream of pseudo-random codes to produce a fast frequency hopped carrier signal further comprises:

frequency sweeping the programmable direct digital frequency synthesizer to generate the fast frequency hopped carrier signal.

64. The method of claim 62, further comprising:

modulating an amplitude of the hybrid spread spectrum signal based upon a fourth steam of pseudo-random codes.

65. The method of claim 62, wherein the predetermined relationships that interrelate the respective codes of the first stream of pseudo random codes, the second stream of pseudo random codes, and the third stream of pseudo random codes are based upon at least one of direct subsets of bits of the pseudo-random code generator, rolling code segments of the pseudo-random code generator, scrambling of code vectors of the pseudo-random code generator, and table-based reassignments of bit-pattern relationships of the pseudo-random code generator, or a combination thereof.

66. The method of claim 62, further comprising:

splitting the hybrid spread spectrum signal into a plurality of component signals, wherein each of the component signals is substantially identical in amplitude; and modulating the amplitude of at least one of the plurality of component signals to control polarization of plurality of components based upon at least one pseudo-random sequence of amplitude control words.

* * * * *

UNITED STATES PATENT AND TRADEMARK OFFICE
CERTIFICATE OF CORRECTION

| | | |
|---|---|---|
| PATENT NO. | : 7,656,931 B2 | Page 1 of 1 |
| APPLICATION NO. | : 10/750432 | |
| DATED | : February 2, 2010 | |
| INVENTOR(S) | : Stephen F. Smith and William B. Dress | |

It is certified that error appears in the above-identified patent and that said Letters Patent is hereby corrected as shown below:

In column 28, line 7, claim 30, please delete "steam" and insert -- stream --.

In column 34, line 19, claim 64, please delete "steam" and insert -- stream --.

Signed and Sealed this

Thirtieth Day of March, 2010

David J. Kappos
*Director of the United States Patent and Trademark Office*